US 6,576,253 B2

(12) United States Patent
Manning et al.

(10) Patent No.: US 6,576,253 B2
(45) Date of Patent: Jun. 10, 2003

(54) FOOD BARS CONTAINING NUTRITIONAL SUPPLEMENTS

(75) Inventors: Paul B. Manning, Keswick, VA (US); Jack H. Schramm, Gordonsville, VA (US); James W. McGrath, Jr., Keswick, VA (US)

(73) Assignee: PBM Pharmaceuticals, Inc., Gordonsville, VA (US)

( * ) Notice: Subject to any disclaimer, the term of this patent is extended or adjusted under 35 U.S.C. 154(b) by 0 days.

(21) Appl. No.: 10/078,814

(22) Filed: Feb. 19, 2002

(65) Prior Publication Data

US 2002/0150607 A1 Oct. 17, 2002

Related U.S. Application Data

(63) Continuation-in-part of application No. 09/730,194, filed on Dec. 5, 2000.

(51) Int. Cl.$^7$ ............................ A61K 47/00; A61K 9/00
(52) U.S. Cl. ........................ 424/439; 424/440; 424/441
(58) Field of Search ................................. 424/439, 441, 424/440

(56) References Cited

U.S. PATENT DOCUMENTS

| | | | |
|---|---|---|---|
| 2,634,210 A | 4/1953 | Kimball | 99/11 |
| 2,961,320 A | 11/1960 | Cuthbertson | 99/56 |
| 3,097,947 A | 7/1963 | Kemmerer | 99/63 |

(List continued on next page.)

FOREIGN PATENT DOCUMENTS

| | | |
|---|---|---|
| EP | 0 102 663 A1 | 3/1984 |
| EP | 0 596 717 A1 | 5/1994 |
| FR | 0 603 460 A1 | 3/1988 |

(List continued on next page.)

OTHER PUBLICATIONS

The Merck Index, Ninth Edition. Merck & Co., Inc., 1976, pp. 1109.*

(List continued on next page.)

Primary Examiner—Thurman K. Page
Assistant Examiner—Rachel M. Bennett
(74) Attorney, Agent, or Firm—Roberta L. Hastreiter; Scott B. Feder; Lord, Bissell & Brook

(57) ABSTRACT

The present invention provides food bars for consumption by pregnant women, lactating women or women of childbearing potential that are attempting to become pregnant containing one or more vitamins and/or minerals, DHA, one or more DHA taste-masking agents and, optionally, one or more anti-constipation and regularity-maintaining agents, methods for preparing these food bars, and methods for supplementing the dietary requirements of pregnant women, lactating women or women of childbearing potential that are attempting to become pregnant. The food bars of the invention generally comprise one or more vitamins and minerals recommended for consumption by pregnant women, lactating women or women of childbearing potential that are attempting to become pregnant in an amount that is effective for enhancing the nutrition of pregnant women, lactating women or women of childbearing potential that are attempting to become pregnant, and that is not harmful to developing fetuses or breast-feeding babies, including calcium in an amount above 1,000 mg, DHA in an amount that is effective for providing, or increasing the supply of, DHA to a developing fetus or baby through a placenta or breast milk, one or more DHA taste-masking agents in an amount that is effective for masking the taste of DHA, and that is not harmful to developing fetuses or breast-feeding babies and, optionally, one or more anti-constipation and regularity-maintaining agents in an amount that is effective for reducing or eliminating constipation, and that is not harmful to developing fetuses or breast-feeding babies, from about 0 to about 99 weight percent of carbohydrates, from about 0 to about 80 weight percent of proteins, and from about 0 to about 60 weight percent of fats.

8 Claims, 1 Drawing Sheet

U.S. PATENT DOCUMENTS

| | | | | |
|---|---|---|---|---|
| 3,243,347 A | 3/1966 | Kracauer | | 167/81 |
| 3,536,494 A | 10/1970 | Johnson | | 99/11 |
| 3,697,641 A | 10/1972 | Ahrens | | 424/38 |
| 3,780,185 A | 12/1973 | Fields | | 426/72 |
| 3,791,241 A | 2/1974 | Frankenfeld | | 99/2 R |
| 3,814,819 A | 6/1974 | Morgan | | 426/72 |
| 3,950,545 A | 4/1976 | Hayward et al. | | 426/72 |
| 3,992,555 A | 11/1976 | Kovacs | | 426/72 |
| 3,992,556 A | 11/1976 | Kovacs et al. | | 426/72 |
| 4,018,900 A | 4/1977 | Hayward et al. | | 426/72 |
| 4,018,901 A | 4/1977 | Hayward et al. | | 426/72 |
| 4,038,422 A | 7/1977 | Keyser et al. | | 426/72 |
| 4,038,423 A | 7/1977 | Hayward et al. | | 426/72 |
| 4,039,688 A | 8/1977 | Hayward et al. | | 426/92 |
| 4,049,832 A | 9/1977 | Hayward et al. | | 426/72 |
| 4,145,448 A | 3/1979 | Hayward et al. | | 426/72 |
| 4,152,462 A | 5/1979 | Hayward et al. | | 426/72 |
| 4,152,463 A | 5/1979 | Hayward et al. | | 426/289 |
| 4,381,697 A | 5/1983 | Crothers | | 99/353 |
| 4,397,880 A | 8/1983 | Crothers | | 426/565 |
| 4,397,881 A | 8/1983 | Crothers | | 426/565 |
| 4,421,771 A | 12/1983 | Stock et al. | | 426/94 |
| 4,431,634 A | 2/1984 | Ellenbogen | | 424/147 |
| 4,496,606 A | 1/1985 | Michnowski | | 426/658 |
| 4,543,262 A | 9/1985 | Michnowski | | 426/306 |
| 4,568,557 A | 2/1986 | Becker et al. | | 426/618 |
| 4,629,625 A | 12/1986 | Gaull | | 424/145 |
| 4,673,578 A | 6/1987 | Becker et al. | | 426/93 |
| 4,698,232 A | 10/1987 | Sheu et al. | | 426/572 |
| 4,710,387 A | 12/1987 | Uiterwaal | | 426/72 |
| 4,747,881 A | 5/1988 | Shaw et al. | | 106/209 |
| 4,749,575 A | 6/1988 | Rotman | | 424/441 |
| 4,751,085 A | 6/1988 | Gaull | | 424/145 |
| 4,759,940 A | 7/1988 | Cattaneo et al. | | 426/588 |
| 4,778,676 A | 10/1988 | Yang et al. | | 424/79 |
| 4,790,991 A | 12/1988 | Shaw et al. | | 424/441 |
| 4,818,539 A | 4/1989 | Shaw et al. | | 424/441 |
| 4,832,971 A | 5/1989 | Michnowski | | 426/302 |
| 4,859,475 A | 8/1989 | Michnowski | | 426/72 |
| 4,871,557 A | 10/1989 | Linscott | | 426/93 |
| 4,882,152 A | 11/1989 | Yang et al. | | 424/440 |
| 4,882,154 A | 11/1989 | Yang et al. | | 424/440 |
| 4,882,160 A | 11/1989 | Yang et al. | | 424/440 |
| 4,900,566 A | 2/1990 | Howard | | 426/72 |
| 4,918,102 A | 4/1990 | Dobbins | | 514/505 |
| 4,994,283 A | 2/1991 | Mehansho et al. | | 426/74 |
| 5,013,752 A | 5/1991 | Dobbins | | 514/505 |
| 5,126,150 A | 6/1992 | Piatt et al. | | 426/94 |
| 5,147,669 A | 9/1992 | Crothers | | 426/72 |
| 5,258,181 A | 11/1993 | Cregier et al. | | 424/195.1 |
| 5,374,433 A | 12/1994 | Bowling et al. | | 426/8 |
| 5,389,395 A | 2/1995 | Joseph | | 426/72 |
| 5,476,678 A | 12/1995 | Walter et al. | | 426/660 |
| 5,494,678 A | 2/1996 | Paradissis et al. | | 424/439 |
| 5,514,382 A | 5/1996 | Sultenfuss | | 424/440 |
| 5,516,524 A | 5/1996 | Kais et al. | | 424/439 |
| 5,536,506 A | 7/1996 | Majeed et al. | | 424/464 |
| 5,562,913 A | 10/1996 | Horrobin | | 424/401 |
| 5,571,441 A | 11/1996 | Andon et al. | | 252/1 |
| 5,576,035 A | 11/1996 | Bowling et al. | | 426/8 |
| 5,582,839 A | 12/1996 | McCarty | | 424/489 |
| 5,612,074 A * | 3/1997 | Leach | | 426/74 |
| 5,654,011 A | 8/1997 | Jackson et al. | | 424/635 |
| 5,744,161 A | 4/1998 | Majeed et al. | | 424/464 |
| 5,776,504 A | 7/1998 | McCarty | | 424/682 |
| 5,776,887 A | 7/1998 | Wilbert et al. | | 514/2 |
| 5,811,125 A | 9/1998 | Galat | | 424/489 |
| 5,866,555 A | 2/1999 | Bell et al. | | 514/60 |
| 5,869,084 A | 2/1999 | Paradissis et al. | | 424/439 |
| 5,869,113 A | 2/1999 | Clayton et al. | | 426/8 |
| 5,906,833 A | 5/1999 | Klatz | | 424/468 |
| 5,976,606 A | 11/1999 | Koga et al. | | 514/60 |
| 6,039,978 A | 3/2000 | Bangs et al. | | 424/489 |
| 6,039,984 A | 3/2000 | Bowling et al. | | 426/61 |
| 6,040,333 A | 3/2000 | Jackson | | 514/456 |
| 6,149,939 A | 11/2000 | Strumor et al. | | 424/464 |
| 6,156,738 A | 12/2000 | Bell et al. | | 514/60 |
| 6,174,542 B1 | 1/2001 | Hinton et al. | | 424/439 |
| 6,258,846 B1 * | 7/2001 | Hermelin et al. | | 514/558 |
| 2002/0032234 A1 | 3/2002 | Hermelin et al. | | 514/560 |
| 2002/0034574 A1 | 3/2002 | Prosise et al. | | 426/560 |
| 2002/0094359 A1 | 7/2002 | Prosise et al. | | 426/72 |

FOREIGN PATENT DOCUMENTS

| | | |
|---|---|---|
| FR | 2 687 548 A1 | 8/1993 |
| FR | 2 693 876 A1 | 1/1994 |
| GB | 2 258 388 A | 9/1988 |
| GB | 2 208 584 A | 4/1989 |
| GB | 2 258 384 A | 2/1993 |
| GB | 2 258 385 A | 2/1993 |
| GB | 2 258 386 A | 2/1993 |
| GB | 2 258 387 A | 2/1993 |
| JP | 61135571 A | 6/1986 |
| JP | 61166379 A | 7/1986 |
| JP | 62003740 A | 1/1987 |
| JP | 62205766 A | 9/1987 |
| JP | 62232361 A | 10/1987 |
| JP | 63207362 A | 8/1988 |
| JP | 01120264 A | 5/1989 |
| JP | 02265457 A | 10/1990 |
| JP | 03094660 A | 4/1991 |
| JP | 03266953 A | 11/1991 |
| JP | 04094669 A | 3/1992 |
| JP | 04341157 A | 11/1992 |
| JP | 05111366 A | 5/1993 |
| JP | 05199855 A | 8/1993 |
| JP | 06086655 A | 3/1994 |

OTHER PUBLICATIONS

Physician's Desk Reference, 49th Edition, 1995, p. 1264 (Medical Economics Data Production Company, Montvale, New Jersey).

Nutrition During Pregnancy, Part I Weight Gain, Part II Nutrient Supplements (National Academy Press, Washington, D.C. 1990).

* cited by examiner

FOOD BARS CONTAINING NUTRITIONAL SUPPLEMENTS

This application is a continuation-in-part application of pending application U.S. Ser. No. 09/730,194, filed on Dec. 5, 2000, which is incorporated by reference in its entirety herein.

BACKGROUND OF THE INVENTION

1. Field of the Invention

The present invention relates to food bars for consumption by pregnant women, lactating women, or women having childbearing potential that are attempting to become pregnant containing one or more vitamins and/or minerals, including calcium in an amount above 1,000 mg, docosahexaenoic acid (DHA), one or more DHA taste-masking agents and, optionally, one or more anti-constipation and regularity-maintaining agents, to methods for preparing these food bars, and to methods for enhancing the nutrition of pregnant women and their developing fetuses, of lactating women and their babies, and of women having childbearing potential that are attempting to become pregnant. In particular, the present invention relates to food bars comprising one or more vitamins and/or minerals recommended for consumption by pregnant women, lactating women, or women having childbearing potential that are attempting to become pregnant in an amount that is effective for enhancing the nutrition of pregnant women, lactating women, or women having childbearing potential that are attempting to become pregnant, or of their developing fetuses or babies, and that is not harmful to developing fetuses or breast-feeding babies, including calcium in an amount above 1,000 mg, DHA in an amount that is effective for providing, or increasing the supply of, DHA to a developing fetus or baby, for example, through a placenta or breast milk, and that is not harmful to developing fetuses or breast-feeding babies, one or more DHA taste-masking agents in an amount that is effective for masking the taste of DHA, and that is not harmful to developing fetuses or breast-feeding babies and, optionally, one or more anti-constipation and regularity-maintaining agents in an amount that is effective for reducing or eliminating constipation, and/or for maintaining regularity of bowel movements, in pregnant women, lactating women, or women having childbearing potential that are attempting to become pregnant, and that is not harmful to developing fetuses or breast-feeding babies.

2. Background

The daily Recommended Dietary Allowances of water-soluble vitamins for non-pregnant and pregnant women, and the rationale for increased allowances during pregnancy, is set forth in *Nutrition During Pregnancy* (Nat'l Academy Press, 1990), and below.

| | Recommended Dietary Allowance | | |
|---|---|---|---|
| Vitamin | Non-pregnant Women | Pregnant Women | Rationale for Increased Allowance for Pregnancy |
| Vitamin C | 60 mg | 70 mg | To provide for fetal needs. At term, fetal plasma levels are 50% higher than maternal levels. |
| Thiamin | 1.1 mg | 1.5 mg | To accommodate maternal and fetal growth and increased energy allowance during pregnancy. |
| Riboflavin | 1.3 mg | 1.6 mg | To provide for increased maternal and fetal synthesis. |
| Niacin (NE)[1] | 15 mg | 17 mg | Based upon energy increase of 300 kcal/day for pregnancy. |
| Vitamin $B_6$ | 1.6 mg | 2.2 mg | Based partially on the additional protein allowance of 10 g/day for pregnancy. |
| Folate | 190 μg | 400 μg | Based on 50% food folate absorption. To build or maintain maternal folate stores and to provide for increased folate turnover in rapidly growing tissue. |
| Vitamin $B_{12}$ | 2.0 μg | 2.2 μg | Fetal needs (0.1–0.2 μg/day) based on analysis of stillborn fetuses. Metabolic needs of pregnancy estimated at 0.2 μg/day. |

[1] NE (niacin equivalent) =1 mg of niacin or 60 mg of tryptophan.

The daily Recommended Dietary Allowances (RDAs) and Estimated Safe and Adequate Daily Dietary Intakes (ESADDIs) compared with the U.S. Recommended Daily Allowances (U.S. RDAs) established by the U.S. Food and Drug Administration of protein, vitamins and minerals for non-pregnant, pregnant and lactating women is set forth in Nutrition During Pregnancy (Nat'l Academy Press, 1990), and below.

| | | U.S. RDA | |
|---|---|---|---|
| Nutrient | RDA or ESADDI for Pregnant Adult Women | Non-Pregnant Women | Pregnant or Lactating Women |
| | RDA | | |
| Protein | 60 g | 65 g | 65 g |
| Vitamin A | 800 mg RE[1] | 5,000 IU | 8,000 IU |
| Vitamin D | 10 μg | 400 IU | 400 IU |
| Vitamin E | 10 mg of α-TE[2] | 30 IU | 30 IU |
| Vitamin K | 5 μg | Not Established | Not Established |
| Vitamin C | 70 mg | 60 mg | 60 mg |
| Thiamin | 1.5 mg | 1.5 mg | 1.7 mg |
| Riboflavin | 1.6 mg | 1.7 mg | 2.0 mg |
| Niacin | 17 mg NE[3] | 20 mg | 20 mg |
| Vitamin $B_6$ | 2.2 mg | 2.0 mg | 2.5 mg |
| Folacin | 400 μg | 400 μg | 800 μg |
| Vitamin $B_{12}$ | 2.2 μg | 6 μg | 8 μg |
| Calcium | 1,200 mg | 1,000 mg | 1,300 mg |
| Phosphorus | 1,200 mg | 1,000 mg | 1,300 mg |
| Magnesium | 300 mg | 400 mg | 450 mg |
| Iron | 30 mg | 18 mg | 18 mg |
| Zinc | 15 mg | 15 mg | 15 mg |
| Iodine | 175 μg | 150 μg | 150 μg |
| Selenium | 65 μg | Not Established | Not Established |
| | ESADDI | | |
| Biotin | 30–100 μg | 300 μg | 300 μg |
| Pantothenic Acid | 4–7 mg | 10 mg | 10 mg |
| Copper | 1.5–3.0 mg | 2 mg | 2 mg |
| Manganese | 2.5–5.0 mg | Not Established | Not Established |
| Fluoride | 1.5–4.0 mg | Not Established | Not Established |
| Chromium | 50–200 μg | Not Established | Not Established |
| Molybdenum | 75–250 μg | Not Established | Not Established |

[1] RE (retinol equivalent) = 1 μg of retinol, 6 μg of β-carotene or 12 μg of other provitamin A carotenoids.
[2] α-TE (tocopherol equivalent) = 1 mg of RRR-α-tocopherol = 1.49 IU of RRR-α-tocopherol = 0.74 IU of all-RAC-α-tocopherol (the synthetic form).
[3] NE (niacin equivalent) = 1 mg of niacin or 60 mg of dietary tryptophan.

Morning sickness generally causes a loss of appetite and a feeling of nausea, and is experienced by a significant number of pregnant women. Because they experience morning sickness, and because the pills that contain the full dose of recommended prenatal vitamins and minerals generally are very large in size, many pregnant women are often reluctant to take their prenatal vitamin and mineral pills. Further, when they do take these pills, these pregnant women often experience difficulty swallowing and retaining these pills, and take the pills without food. Vitamins and minerals that are taken without food are not absorbed as well as those taken with some food. Problems, thus, arise concerning patient compliance (the daily consumption of vitamin and mineral supplements), maintaining or enhancing the health of pregnant woman, and the absorption of the quantity of vitamins and minerals that are associated with proper fetal development. Moreover, regurgitation after consuming a vitamin and mineral pill causes loss of some or all of the nutrients that were originally present in the pill.

Morning sickness generally occurs most frequently during the first trimester of pregnancy. Defects in the neural tube of a developing fetus (spina bifida) can also occur during the first trimester of pregnancy, for example, during the first month of gestation, before a woman may have become aware of her pregnancy. These defects are known to be linked to an inadequate intake of folic acid. It is well known that folic acid prevents neural tube defects. Thus, folic acid should be consumed in sufficient quantities by women of child-bearing ages. Folic acid has also been shown to have beneficial cardiac effects, and to decrease the risk of cervical dysplasia.

Calcium is critical for proper fetal development, and is essential for the production of milk by women. The administration of calcium to a pregnant or lactating woman also acts to prevent early osteoporosis in the woman as a result of a calcium drain in the woman during pregnancy or lactation.

A recent University of North Carolina at Chapel Hill study that was described in an article appearing in a November, 2000, issue of *Science Daily* magazine and entitled, "New Research Shows Calcium Deficiency Permits Faster Lead Release from Pregnant Women's Bones," showed that pregnant women who do not consume enough calcium in their diets, or through supplements, show greater increases in lead in their bloodstreams than pregnant women with normal calcium levels. Bone tissue, which contains about 95% of the body's lead, demineralizes more rapidly in pregnant women who are getting less calcium in comparison with other pregnant women. Such demineralization releases locked-up lead into the blood, particularly during the second half of pregnancy, and may cause harm to both pregnant women and their fetuses. (Past research has linked lead to many adverse conditions, including nervous system and possible cardiovascular problems.) This study also showed that calcium consumption can minimize bone demineralization in pregnant women, and that one variable associated with a reduced lead level is a higher calcium intake. Calcium intake at the recommended daily allowance level was found to protect somewhat against lead, and higher calcium levels were found to correspond with even less lead. The protective effect of calcium was found to become stronger as pregnancy progressed.

Docosahexaenoic acid (DHA) is an omega-3 long-chain fatty acid, the primary structural fatty acid in the gray matter of the brain, and in the retina of the eye. It is essential for normal visual and neurological (nervous system) development in infants, and for normal brain and eye function in adults. Significant brain and eye development occurs in utero, and continues during the first year after birth. The DHA content of the fetal brain increases three to five times during the final trimester of pregnancy and triples yet again during the first week of life. Thus, an adequate dietary intake of DHA is particularly important for pregnant and nursing women. Infants rely on their mothers to supply DHA for their developing brain and eyes initially through the placenta, and subsequently through the breast milk. The human body only synthesizes small quantities of DHA. As a result, it is necessary to obtain DHA from dietary sources. The primary source of DHA is fatty fish, such as mackerel, salmon, herring, sardines, black cod, anchovies and albacore tuna, and oils from the tissues of such fish. As a result, DHA has an unpleasant "fishy" taste, and generally imparts this undesirable taste to food ingredients, components or items to which it is added.

Many other vitamins, minerals and other nutritional supplements, such as those set forth hereinabove, are recommended for pregnant, lactating women and women having childbearing potential that are attempting to become pregnant.

The classical solid dosage forms that have been used as delivery systems for nutritional supplements, such as prenatal vitamins and minerals, for pregnant and lactating women, for example, tablets and capsules, have known concerns about their proper disintegration and dissolution, and about the bioavailablity of the nutritional supplements contained therein, and are often harsh on the stomach. Further, these tablets and capsules generally cannot contain more than about 500 mg of calcium, which is much lower than the Recommended Dietary Allowance established for pregnant women.

Unfortunately, pregnancy and lactation often interrupt the regularity of women's bowel movements, and cause women to become constipated (to experience difficulties having regular and comfortable bowel movements). This, in turn, often results in the women experiencing painful and unattractive hemorrhoids. The constipation experienced by pregnant and lactating women is often exacerbated by the effects of pre-natal doses of vitamins and/or minerals, in particular, iron.

It would be beneficial to provide a product that is high in nutritional value for pregnant women, lactating women, and women having childbearing potential that are attempting to become pregnant that properly disintegrates and dissolves, thereby allowing the nutrients present therein to become bioavailable for the consumer, that is gentle on the stomach, that encourages patient compliance, that contains a large quantity of calcium, that contains DHA, that does not have a "fishy" taste, and that, optionally, reduces or eliminates constipation, making excretion more regular and comfortable.

The food bars of the present invention advantageously are desirable-tasting, are easily chewable, are gentle on the stomach, and supplement the nutritional requirements of pregnant women, lactating women, and women having childbearing potential that are attempting to become pregnant. These food bars generally contain a dispersed system of slowly-released vitamins and/or minerals in a stable matrix for oral ingestion and absorption. The food bars readily disintegrate and dissolve, are digestible, and provide a bio-available form of nutritional supplementation for pregnant women, lactating women, and women having childbearing potential that are attempting to become pregnant. Because the food bars are not in the form of large pills, tablets or capsules, and have a desirable taste, these food bars also provide for an improved patient compliance with the daily regime of consuming vitamin and mineral supplements during an often difficult period of time. Further, because they may contain one or more anti-constipation and regularity-maintaining agents, the food bars of the invention may help maintain regular bowel movements and reduce or eliminate constipation, and associated painful and unattractive hemorrhoids, which may occur during pregnancy or lactation, or which may be a side effect resulting from the consumption of certain nutritional supplements, such as iron. Thus, the food bars of the invention may permit the maintenance of more regular and comfortable excretions of bowel movements by pregnant women, lactating women, and women having childbearing potential that are attempting to become pregnant. The food bars of the invention overcome the shortcomings of other prenatal or lactation vitamin and mineral supplements, such as large vitamin pills, and deliver to pregnant women, lactating women, and women having childbearing potential that are attempting to become pregnant specific doses of vitamins, minerals and/or other nutritional supplements in a bio-available absorption format. As a result of folic acid that may be present therein, the food bars of the invention may also have beneficial properties protecting against neural tube defects. In addition, these food bars have the ability to deliver the Recommended Dietary Allowance, or higher levels, of calcium in a bio-available form to pregnant women, lactating women, and women having childbearing potential that are attempting to become pregnant. These are significantly greater quantities of calcium than can be effectively delivered in a prenatal vitamin pill, tablet or capsule. Moreover, although these food bars contain DHA, which generally imparts an unpleasant and undesirable "fishy" taste to food ingredients, components or items to which it is added, the food bars of the invention do not have an unpleasant or "fishy" taste but, rather, have a pleasant taste. Further, the dispersed system of the food bars, along with the chewing action of the women during consumption, diminishes the concerns related to the disintegration and dissolution of the classical solid dosage forms, and the bioavailablity of the nutritional supplements contained therein.

DESCRIPTION OF THE RELATED ART

The Physicians' Desk Reference (49$^{th}$ Edition, 1995, and 54$^{th}$ Edition, 2000) describes a prenatal vitamin and mineral tablet marketed by Lederle Laboratories (Waynem, N.J.) under the trademark name Materna® (pages 1264 and 1534, respectively).

U.S. Pat. No. 2,634,210 discloses chocolate food products, including bars (FIGS. 1 and 2), having two or more layers, and vitamins and minerals dispersed in one or more of the layers. This patent does not describe single-layer food bars, the use of anti-constipation and regularity-maintaining agents or folic acid in food bars, or the administration of food bars to pregnant or lactating women.

U.S. Pat. No. 3,814,819 discloses a protein fortified food bar of a controlled calorie content that contains a vitamin and mineral mixture, and that is composed of several crisp wafers stacked one above the other with a creamy filling between the wafers. This patent does not describe single-layer food bars, the use of anti-constipation and regularity-maintaining agents or folic acid in food bars, or the administration of food bars to pregnant or lactating women.

U.S. Pat. No. 4,018,901 discloses a high protein food bar that has a marshmallow matrix as a base, and a water activity less than 0.85, and that may include fat-coated vitamins. This patent does not describe the use of anti-constipation and regularity-maintaining agents or folic acid in food bars, or the administration of food bars to pregnant or lactating women.

U.S. Pat. No. 4,038,423 discloses a food bar having a base containing marshmallow fortified with a high protein ingredient of reduced water binding capability, and a coating containing fat-coated vitamins. This patent does not describe the use of anti-constipation and regularity-maintaining agents or folic acid in food bars, or the administration of food bars to pregnant or lactating women.

U.S. Pat. No. 4,710,387 discloses a nutritional supplement preparation (a powder material in Example 1, and a milk-like drink in Example 2) for pregnant and breast-feeding women containing 10–20% by weight of protein, 16–28% by weight of fat, 43–65% by weight of carbohydrates, 3.5% by weight of moisture, and one or more minerals, trace elements and vitamins, such as calcium and folic acid. This patent does not describe food bars, or the use of anti-constipation and regularity-maintaining agents.

U.S. Pat. No. 4,751,085 discloses vitamin compositions containing taurine (2-aminoethanesulfonic acid) provided either alone or in food products, such as enriched breads, ready-to-eat cereals and breakfast beverages. This patent does not describe food bars.

U.S. Pat. No. 5,126,150 discloses a baked cookie containing calcium lactate coated psyllium fiber, insoluble dietary fiber, shortening, flour, sugar and water for use in the control of bowel function (including as a laxative). This patent does not describe food bars, the use of folic acid in food bars, or the administration of food bars to pregnant or lactating women.

U.S. Pat. No. 5,494,678 discloses multi-vitamin and mineral supplements for incorporation into tablets, powders, granules, beads, lozenges, capsules and liquids, and administration to a pregnant woman during her first, second and third trimesters of pregnancy. The supplements contain specific regimens of a calcium compound, vitamin D, folic acid, vitamin $B_{12}$, vitamin $B_6$, and vitamin $B_1$. This patent does not describe food bars or anti-constipation and regularity-maintaining agents.

U.S. Pat. No. 5,571,441 discloses nutritional supplement compositions containing vitamins, minerals, central nervous system bracers, such as caffeine, and flavenols, that are coadministered in the form of a tablet or capsule, as a powder, or as a liquid form. This patent does not describe food bars or the administration of vitamins or minerals to pregnant or lactating women.

U.S. Pat. Nos. 5,654,011 and 6,040,333 disclose vitamin- and mineral-containing dietary supplements, including dietary bars, for supplementing the dietary needs of women and preventing or reducing life stage associated health risks during each of their principal adult life stages (childbearing or pre-perimenopause, perimenopause and menopause, or post-menopause). These patents do not describe anti-constipation and regularity-maintaining agents.

U.S. Pat. No. 5,869,084 discloses multi-vitamin and mineral supplements for administration to lactating, non-lactating (but not pregnant) and menopausal women in the form of tablets, powders, granules, beads, lozenges, capsules or liquids. This patent does not disclose food bars, or the administration of vitamins or minerals to pregnant women.

U.S. Pat. No. 5,906,833 discloses nutritional supplements, including food bars, that contain vitamins. This patent does not describe the use of folic acid or calcium in food bars, anti-constipation and regularity-maintaining agents or the administration of food bars to pregnant or lactating women.

U.S. Pat. No. 6,039,978 discloses a dietary food enhancement agent for fortifying food products (meats, rolls, muffins, breads, sauces, desserts, soups, potatoes, rice, cereals or fruit or vegetable juice beverages). The agent contains a pre-mixed combination of calcium, folic acid and other vitamins and minerals. The nutritional enhancement is administered to a patient having at least one dietary response condition, such as obesity, hypertension, hyperlipidemia, cancer or diabetes. This patent does not describe the administration of food bars to pregnant or lactating women.

SUMMARY OF THE INVENTION

The present invention provides food bars for consumption by pregnant women, lactating women, or women having childbearing potential that are attempting to become pregnant containing one or more vitamins and/or minerals, including calcium in an amount above 1,000 mg, DHA, one or more DHA taste-masking agents and, optionally, one or more anti-constipation and regularity-maintaining agents. The food bars supplement the dietary requirements of pregnant women, lactating women and women having childbearing potential that are attempting to become pregnant. They generally comprise one or more vitamins and/or minerals recommended for consumption by pregnant women, lactating women or women having childbearing potential that are attempting to become pregnant in an amount that is effective for enhancing the nutrition of pregnant women, lactating women, or women having childbearing potential that are attempting to become pregnant, or of their developing fetuses or babies, and that is not harmful to developing fetuses or breast-feeding babies, including calcium in an amount above 1,000 mg, DHA in an amount that is effective for providing, or increasing the supply of, DHA to a developing fetus or baby through, for example, a placenta or breast milk, and that is not harmful to developing fetuses or breast-feeding babies, one or more DHA taste-masking agents in an amount that is effective for masking the taste of DHA, and that is not harmful to developing fetuses or breast-feeding babies and, optionally, one or more anti-constipation and regularity-maintaining agents in an amount that is effective for maintaining bowel movement regularity and/or reducing or eliminating constipation, and that is not harmful to developing fetuses or breast-feeding babies, from about 0 to about 99 weight percent of carbohydrates, from about 0 to about 80 weight percent of proteins, and from about 0 to about 60 weight percent of fats.

Vitamins, minerals and/or other nutritional supplements that may be present in the food bars of the invention include protein, Vitamin A, Vitamin $B_1$, Vitamin $B_2$, Vitamin $B_3$, Vitamin $B_6$, Vitamin $B_{9/M}$, Vitamin $B_{12}$, Vitamin C, Vitamin D, Vitamin E, Vitamin K, Niacinamide, Tocopheryl, Calcium, Iron, Phosphorus, Pantothenic Acid, Iodine, Magnesium, Biotin, Folacin, Zinc, Selenium, Copper, Manganese, Chromium, Molybdenum, Choline, Fluoride, Chloride, Potassium, Sodium, Docosahexaenoic Acid (DHA) or Calcium Polycarbophil. The quantity of vitamins, minerals, DHA, one or more DHA taste-masking agents, anti-constipation and regularity-maintaining agent, and other nutritional supplements that are present in the food bars of the invention is a quantity that is not harmful to pregnant women, lactating women, or women having childbearing potential that are attempting to become pregnant, or to their developing fetuses or babies.

The food bars of the invention may readily be prepared in a cost-effective manner using standard machinery and techniques, and have a shelf life of approximately six to twenty-four months at normal room temperature.

The present invention also provides methods for preparing these food bars, and methods for supplementing the dietary requirements of pregnant women, lactating women and/or women having childbearing potential that are attempting to become pregnant.

DETAILED DESCRIPTION OF THE PREFERRED EMBODIMENTS

Figure 1:
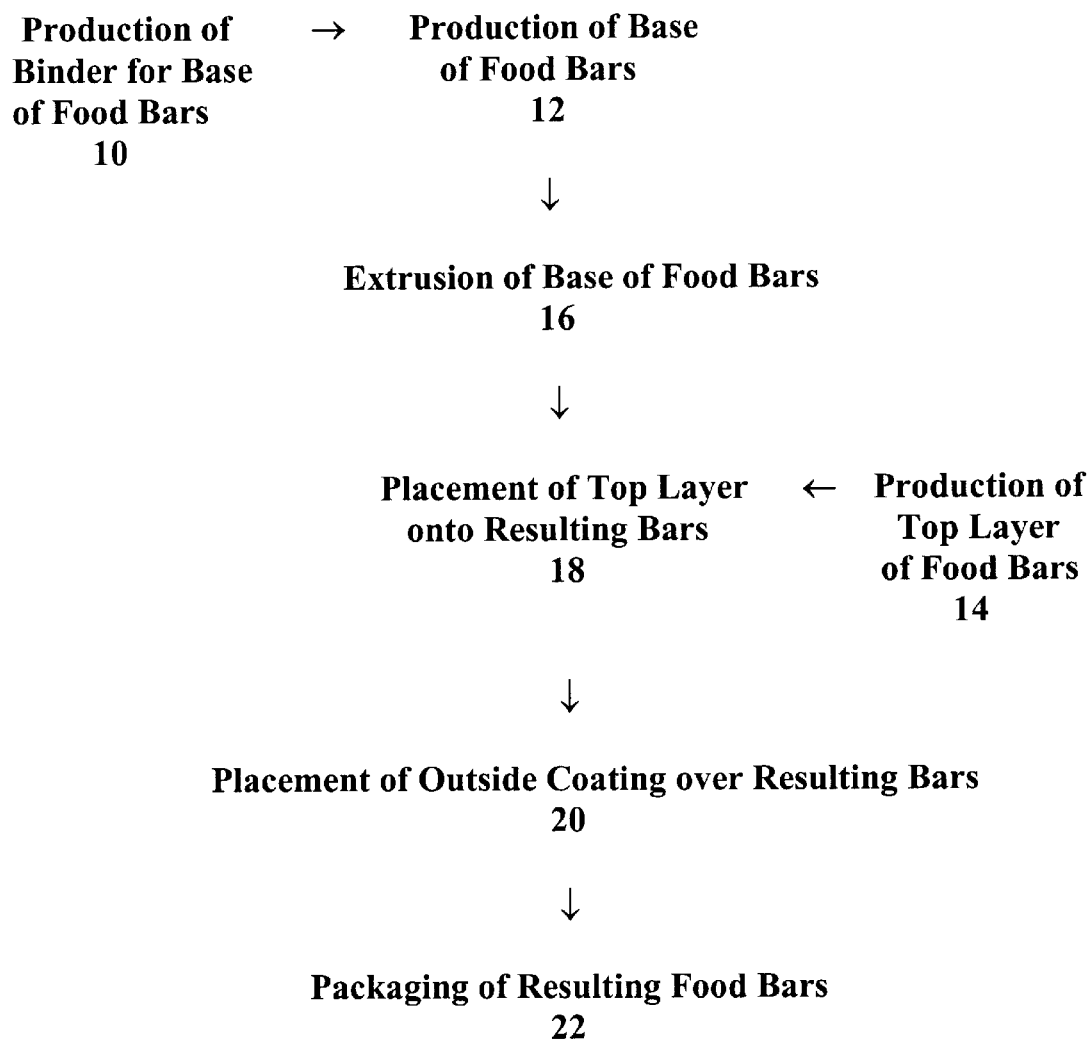
FIG. 1 is a schematic drawing showing one embodiment of the process for preparing food bars according to the invention.

The present invention may be understood more readily by reference to the following detailed description of the preferred embodiments of the invention, and to the example included therein.

Food Bars

In one aspect, the present invention provides food bars for consumption by pregnant women, lactating women (women who are secreting milk) or women having childbearing potential that are attempting to become pregnant containing one or more vitamins, minerals and/or other nutritional supplements recommended for consumption by pregnant women, lactating women or women having childbearing potential that are attempting to become pregnant, including calcium in an amount above 1,000 mg, DHA, one or more DHA taste-masking agents and, optionally, one or more anti-constipation and regularity-maintaining agents. Infertile women (women of childbearing age that have unsuccessfully attempted to become pregnant for more than one year, but that have the capacity to become pregnant) are one example of women having childbearing potential that are attempting to become pregnant. Other examples of such women include women of childbearing age that have the ability to become pregnant, and that have unsuccessfully attempted to become pregnant for one year or less, or that are commencing their attempts to become pregnant.

The food bars of the invention contain the ingredients, and amounts thereof, described herein.

The food bars of the invention generally comprise one or more vitamins and/or minerals recommended for consumption by pregnant women, lactating women or women having childbearing potential that are attempting to become pregnant in an amount that is effective for enhancing the nutrition of pregnant women, lactating women or women having childbearing potential that are attempting to become pregnant, or of their developing fetuses or babies, and that is not harmful to developing fetuses or breast-feeding babies, DHA in an amount that is effective for providing, or increasing the level of, DHA in pregnant women, lactating women or women having childbearing potential that are attempting to become pregnant, or in their developing fetuses or babies (through, for example, the placenta, or the mothers' breast milk), and that is not harmful to developing fetuses or breast-feeding babies, one or more DHA taste-masking agents in an amount that is effective for masking the taste of DHA, and that is not harmful to developing fetuses or breast-feeding babies and, optionally, one or more anti-constipation and regularity-maintaining agents in an amount that is effective for maintaining regular bowel movements and/or reducing or eliminating constipation, and that is not harmful to developing fetuses or breast-feeding babies, from about 0 to about 99 weight percent of carbohydrates, from about 0 to about 80 weight percent of proteins, and from about 0 to about 60 weight percent of fats.

Vitamins and Minerals

A wide variety of vitamins and minerals that are safe for consumption by pregnant women, lactating women or women having childbearing potential that are attempting to become pregnant may be used in the food bars of the invention in varying quantities. These vitamins and minerals include, for example, Vitamin A, Vitamin $B_1$ (as Thiamin or Thiamine Mononitrate), Vitamin $B_2$ (as Riboflavin), Vitamin $B_3$ (as Niacin), Vitamin $B_6$ (as Pyridoxine or Pyridoxine Hydrochloride), Vitamin $B_{9/M}$ (Folic Acid), Vitamin $B_{12}$ (cyanocobalamine), Biotin, Vitamin C (Ascorbic Acid), Vitamin D, Vitamin E (as dl-Alpha Acetate or d-alpha Nat'l), Vitamin K, Folacin, Niacinamide, Tocopheryl, Calcium (as Calcium Carbonate), Iron (as Ferrous Fumarate), Phosphorus, Pantothenic Acid (as Calcium Pantothenate), Iodine (as Potassium Iodide), Magnesium (as Magnesium Oxide), Zinc (as Zinc Oxide), Selenium (as Sodium Selenate), Copper (as Cupric Oxide), Manganese (as Manganese Sulfate), Chromium (as Chromium Chloride), Molybdenum (as Sodium Molybdate), Choline, Fluoride, Chloride, Potassium, Sodium, and mixtures thereof. Such vitamins and minerals are commercially available from sources known by those of skill in the art, such as Hoffmann-LaRoche Inc. (Nutley, N.J.).

Pre-mixes containing vitamins and minerals recommended for pregnant women, lactating women and women having childbearing potential that are attempting to become pregnant that may be employed to produce the food bars of the present invention may be obtained from Watson Foods Co., Inc. under Watson Code WT-6061A. One of these pre-mixes contains the nutrients set forth below.

| Nutrient | Per 6,000 mg |
|---|---|
| Vitamin A (Vitamin A Palmitate) | 2500 I.U. |
| Vitamin A (Beta Carotene) | 2500 I.U. |
| Thiamin (Thiamin Mononitrate) | 3 mg |
| Riboflavin | 3.4 mg |
| Niacin (Niacinamide) | 20 mg |
| Pyridoxine (Pyridoxine Hydrochloride) | 10 mg |
| Folic Acid | 1 mg |
| Vitamin $B_{12}$ (Cyanocobalamine) | 0.012 mg |
| Biotin | 0.3 mg |
| Vitamin C (Ascorbic Acid) | 120 mg |
| Vitamin D (Cholecalciferol) | 400 I.U. |
| Vitamin F (d,1 Alpha Tocopheryl Acetate) | 30 I.U. |
| Calcium (Dicalcium Phosphate, Calcium Carbonate) | 1200 mg |
| Iron (Ferrous Fumarate) | 27 mg |
| Pantothenic Acid (d-Calcium Pantothenate) | 10 mg |
| Iodine (Potassium Iodide) | 0.15 mg |
| Magnesium (Magnesium Oxide) | 400 mg |
| Zinc (Zinc Oxide) | 25 mg |
| Selenium (Sodium Selenate) | 0.07 mg |
| Copper (Cupric Oxide) | 2 mg |
| Manganese (Manganese Sulfate) | 5 mg |
| Chromium (Chromium Chloride) | 0.125 mg |
| Molybdenum (Sodium Molybdate) | 0.0750 mg |
| Maltodextrin, QS to make 6,000 mg | |

The food bars of the invention may be formulated using any pharmaceutically-acceptable forms of the vitamins and/or minerals described above, including their salts, which are known by those of skill in the art. For example, useful pharmaceutically-acceptable calcium compounds include any of the well-known calcium supplements, such as Calcium Carbonate, Calcium Sulfate, Calcium Oxide, Calcium Hydroxide, Calcium Apatite, Calcium Citrate-Malate, Bone Meal, Oyster Shell, Calcium Gluconate, Calcium Lactate, Calcium Phosphate, Calcium Levulinate, and the like. An instantly soluble calcium preparation that is composed of organic calcium salts, that is suitable for mineral fortification of food products, and that is known as Instant Calcium, is available from Flavor-Savor, Inc. (Franklin Park, Ill.). This product is generally odorless, tasteless and colorless when dissolved in either cold or hot water, and provides about 10% of the calcium Recommended Daily Allowance per 1 gram. Pharmaceutically-acceptable magnesium compounds include Magnesium Stearate, Magnesium Carbonate, Magnesium Oxide, Magnesium Hydroxide and Magnesium Sulfate. Pharmaceutically-acceptable iron compounds include any of the well-known Iron II (ferrous) or Iron III (ferric) supplements, such as Ferrous Sulfate, Ferric Chloride, Ferrous Gluconate, Ferrous Lactate, Ferrous Tartrate, Iron-Sugar-Carboxylate complexes, Ferrous Fumarate, Ferrous Succinate, Ferrous Glutamate, Ferrous Citrate, Ferrous Pyrophosphate, Ferrous Cholinisocitrate, Ferrous Carbonate, and the like.

The vitamins and/or minerals used to prepare the food bars of the invention may be microencapsulated in a coating of fat, microcrystalline cellulose or similar material in order to prevent their degradation under various conditions.

The vitamins and/or minerals that are employed in the food bars of the invention are those that are recommended for consumption by pregnant women, lactating women or women having childbearing potential that are attempting to become pregnant. These vitamins and minerals are employed in an amount that is effective for enhancing the nutrition of pregnant women, lactating women or women having childbearing potential that are attempting to become pregnant, or of their developing fetuses or babies. This quantity will vary depending upon the particular vitamins and/or minerals chosen for use, but generally ranges from about 2.5 to about 50 weight percent of the total weight of the food bars, and preferably ranges from about 5 to about 25 weight percent, with about 10 weight percent being most preferred. Low- or high-iron (as that term is defined in the art) food bars may be prepared in accordance with the present invention.

Each food bar of the invention may contain one or more of the above vitamins and/or minerals in any quantity that is safe for consumption by pregnant women, lactating women or women having childbearing potential that are attempting to become pregnant (i.e., a quantity that would not cause harm to the woman consuming the food bar, or to her developing fetus or breast-feeding baby). Set forth hereinbelow are the approximate preferred ranges of the daily quantities of the various vitamins and minerals that may generally be used in one food bar of the invention (or divided between more than one food bar for consumption during a one-day period) for pregnant women, lactating women or women having childbearing potential that are attempting to become pregnant (from about one quantity to about another quantity), as well as more preferred ranges, and the most preferred quantities.

|  | Preferred Range | More Preferred Range | Most Preferred Quantity for Pregnant Women | Most Preferred Quantity for Lactating Women |
|---|---|---|---|---|
| Vitamin | | | | |
| Vitamin A | 0–9,000 I.U. | 1,000–7,000 I.U. | 5,000 I.U. | 7,000 I.U. |
| Vitamin $B_1$ (Thiamin) | 0–50 mg | 1.4–10 mg | 3 mg | 3.2 mg |
| Vitamin $B_2$ (Riboflavin) | 0–50 mg | 1.6–25 mg | 3.4 mg | 3.9 mg |
| Vitamin $B_3$ (Niacin) | 0–60 mg | 17–40 mg | 20 mg | 24 mg |
| Vitamin $B_6$ (Pyridoxine) | 0–50 mg | 2.2–40 mg | 10 mg | 9.5 mg |
| Vitamin $B_{9/M}$ (Folic Acid) | 0–2,000 mcg | 400–1,000 mcg | 1,000 mcg | 400 mcg |
| Vitamin $B_{12}$ (cyanocobalamine) | 0–1,000 mcg | 2.6–18 mcg | 12 mcg | 14 mcg |
| Biotin | 0–600 mcg | 30–400 mcg | 30 mcg | 35 mcg |
| Vitamin C | 0–1,000 mg | 80–500 mg | 120 mg | 163 mg |
| Vitamin D | 0–800 I.U. | 200–400 I.U. | 400 I.U. | 400 I.U. |
| Vitamin E | 0–1,500 I.U. | 10–400 I.U. | 30 I.U. | 36 I.U. |
| Vitamin K | 0–80 mcg | 10–65 mcg | 10 mcg | 10 mcg |
| Mineral | | | | |
| Calcium | above 1,000 to 3,000 mg | above 1,000 to 2,000 mg | 1,300 mg | 1,300 mg |
| Iron | 0–100 mg | 18–90 mg | 27 mg | 27 mg |
| Phosphorus | 0–2,000 mg | 100–1,250 mg | 100 mg | 100 mg |
| Pantothenic Acid | 0–20 mg | 6–15 mg | 10 mg | 10 mg |
| Iodine | 0–200 mcg | 175–200 mcg | 175 mcg | 200 mcg |
| Magnesium | 0–600 mg | 200–500 mg | 400 mg | 360 mg |
| Zinc | 0–30 mg | 1–25 mg | 10 mg | 10 mg |
| Selenium | 0–400 mcg | 60–100 mcg | 60 mcg | 70 mcg |
| Copper | 0–2 mg | 0.1–2 mg | 2 mg | 2 mg |
| Manganese | 0–5 mg | 0.1–5 mg | 5 mg | 5 mg |
| Chromium | 0–150 mcg | 0.1–120 mcg | 25 mcg | 25 mcg |
| Molybdenum | 0–75 mcg | 0.1–50 mcg | 25 mcg | 25 mcg |
| Choline | 0–1,000 mg | 300–600 mg | 450 mg | 550 mg |
| Fluoride | 0–5 mg | 1–4 mg | Not Established | Not Established |
| Chloride | 0–3,400 mg | 10–1,000 mg | Not Established | Not Established |
| Potassium | 0–80 mg | 10–80 mg | Not Established | Not Established |
| Sodium | 0–2,400 mg | 10–1,000 mg | Not Established | Not Established |

One food bar of the invention may contain each of the above vitamins and minerals in their preferred quantity range (or in their more preferred range, or in the most preferred quantity for pregnant women, lactating women or women having childbearing potential that are attempting to become pregnant). Alternatively, with the exception of calcium, one food bar may contain each of these vitamins and/or minerals in one half, one third, one forth, one-fifth, one sixth, and so forth, of these quantities. Varying combinations of the vitamins and minerals may also be employed. It is important that the quantity of each vitamin and mineral used in a food bar is safe for consumption by pregnant women, lactating women or women having childbearing potential that are attempting to become pregnant, and is safe for their developing fetuses or babies. Larger quantities of certain vitamins or minerals may cause damage to a developing fetus or baby. Those of skill in the art know the quantities of vitamins and minerals above the Recommended Dietary Allowance, Estimated Safe and Adequate Daily Dietary Intakes or U.S. Recommended Daily Allowance for pregnant women, lactating women or women having childbearing potential that are attempting to become pregnant that would be harmful for the women consuming the food bars, or for their developing fetuses or babies.

Docosahexaenoic Acid

Docosahexaenoic acid (DHA) is a long-chain fatty acid that is necessary for brain and eye development in children, and is commercially available from sources known by those of skill in the art.

DHA is included as an ingredient of the food bars of the invention in an amount that is effective for providing, or increasing the supply of, DHA to developing fetuses or babies through, for example, placentas or breast milk, and that is not harmful to developing fetuses or breast-feeding babies. This amount generally ranges from about 0.05 to about 3 weight percent of the total weight of the food bars, and preferably ranges from about 0.2 to about 0.6 weight percent, with about 0.3 weight percent being most preferred (for pregnant women, lactating women, and women having childbearing potential that are attempting to become pregnant). DHA will generally be present in the food bars of the invention in an amount ranging from about 0.1 to about 1,000 mg, with about 200 to 600 mg being preferred, and about 300 mg being most preferred (for all three categories of women). Such levels of DHA impart an unpleasant "fishy" taste to food ingredients, components or items to which it is added. However, as a result of DHA taste-masking agents that are present in the food bars of the invention, the food bars of the invention do not have an unpleasant or "fishy" taste, but rather have a pleasant, desirable taste.

DHA Taste-Masking Agents

The food bars of the invention contain one or more DHA taste-masking agents which, alone or in combination of two, three, four, five, six or more, mask (significantly reduce or eliminate) the unpleasant or "fishy" taste that DHA would otherwise impart to food ingredients, components or items. As a result, these food bars do not have a "fishy" taste, but rather have a pleasant taste. The taste of the food bars will depend, in part, upon the type and/or combination of the DHA taste-masking agents employed in the food bars, and upon flavoring agents employed in the food bars. For example, as a result of the DHA taste-masking agent(s) chosen for use, the food bars of the invention may taste like cocoa, chocolate, chocolate fudge, peanut butter, vanilla, maple, coconut, brown sugar, white sugar, honey, molasses, corn syrup, marshmallow, various fruit flavors (orange, lemon, lime, grapefruit, banana, grape, cherry, raspberry, pineapple, apple, peach, plum, pear, etc.) or a combination of the foregoing flavors. A person of ordinary skill in the art may readily determine the taste that various food bars of the invention will have depending upon the type and/or combination of the DHA taste-masking agents employed to produce the food bars.

The DHA taste-masking agents that may be employed in the food bars of the invention are commercially available from sources known by those of skill in the art, and include high fructose corn syrup, corn syrup, oligofructose, honey, cocoa powder, sugar (white, brown, powdered, etc.), chocolate, unsweetened chocolate, maltodextrins, natural flavors, for example, citrus, acidic and other natural flavors (grapefruit, grapefruit rind, lemon, lemon rind, lime, lime rind, orange, orange rind, tangerine, cherry, rasberry, blueberry, banana, mango, grape, apple, pear, peach, plum, watermelon, pinapple, coconut, kiwi, etc., or the juice from any of the foregoing) and other components that are known to mask the taste of DHA. Natural flavors and maltodextrins are preferred for use as DHA taste-masking agents.

The one or more DHA taste-masking agents that are included as ingredients of the food bars of the invention may be present in an amount that is effective for masking (significantly reducing or eliminating) the taste of DHA, and that is not harmful to developing fetuses or breast-feeding babies. This amount generally ranges from about 3 to about 40 weight percent (including each of the one or more DHA taste-masking agents employed) of the total weight of the food bars, and preferably ranges from about 20 to about 30 weight percent (for pregnant women, lactating women and women having childbearing potential that are attempting to become pregnant). The most preferred quantity will vary depending upon the number and type of the DHA taste-masking agents employed in the food bars, and may readily be determined by a person having ordinary skill in the art.

Each of the DHA taste-masking agents employed in the food bars of the invention may be used in any ratio with other DHA taste-masking agents employed in the food bars that is effective for masking the taste of DHA, and that is not harmful to developing fetuses or breast-feeding babies.

Anti-Constipation and Regularity-Maintaining Agents

A wide variety of anti-constipation and regularity-maintaining agents may, optionally, also be used in the food bars of the present invention in varying quantities. As used herein, the phrase "anti-constipation and regularity-maintaining agent" means any naturally-occurring substance, chemical, medicine, food component, food, or other substance, whether natural, by prescription or over-the-counter, that will not cause any harm to pregnant women, lactating women or women having childbearing potential that are attempting to become pregnant, or to their developing fetuses or breast-feeding babies, and aids in maintaining regular bowel movements and/or reduces or eliminates constipation (infrequent or difficult bowel movements). Generally, bowel movements are considered to be regular when they occur once or more every three days, and preferably once or more every two days, and more preferably once or more every day. However, the regularity of bowel movements differs for different individuals. Bowel movements that may be considered regular by one individual may not be considered regular by another individual. Anti-constipation and regularity-maintaining agents often increase the bulk or water content of stools, making bowel movements more regular and/or comfortable. The anti-constipation and regularity-maintaining agents may be bulk-forming ingredients (ingredients that increase the bulk volume and water content of the stool, thereby promoting bowel movements) or laxative ingredients.

Some of the known naturally-occurring, chemical, medicinal, prescription or over-the-counter agents for maintaining regularity and/or reducing or eliminating constipation include, for example, agar, alpha cellulose, linseed (whole, crushed or rough ground), psyllium, psyllium seed, psyllium seed (blond), psyllium seed husk, psyllium hydrophilic mucilloid, calcium lactate coated psyllium, kelp, Plantago ovata husks, polycarbophil, calcium polycarbophil, linolenic acid, carrageenan (degraded or native), guar gum, malt soup extract, karaya, methylcellulose, carboxymethylcellulose, sodium carboxymethylcellulose, docusate sodium, bran (wheat, corn, barley, rye, oats, cereal or other grain products, particularly in whole form), flax, flaxseed (whole, crushed or rough ground), flaxseed oil, beans, nuts, seeds, fruit (particularly when the skin is present), pectin, vegetables (particularly raw, and when the skin is present), diphenylmethane derivatives, such as phenolphthalein and bisacodyl, saline and osmotic laxatives (various $Mg^{2+}$ salts, such as magnesium sulfate, magnesium citrate, and magnesium hydroxide, the sulfate, phosphate and tartrate salts of $Na^+$ or $K^+$, such as sodium phosphate, sodium biphosphate, sodium sulfate, sodium bicarbonate, sodium chloride, potassium chloride, potassium sodium tartrate, and tartaric acid and its salts), castor oil, mineral oil, the dissacharides lactulose, glycerin and sorbitol, and other forms of soluble and insoluble fiber, all of which are commercially available from sources known in the art, and mixtures thereof. Calcium polycarbophyll, psyllium, methylcellulose, wheat fiber and bran are preferred anti-constipation and regularity-maintaining agents for use in the food bars of the invention.

Some fiber is soluble in water, and other fiber is insoluble. Insoluble fiber is indigestible, and passes through the body virtually intact. It aids digestion, adds bulk to stools, and hastens the passage of fecal material through the abdomen, thus, helping to prevent or alleviate constipation, and related hemorrhoids. Foods containing high levels of soluble fiber are dried beans, oats, barley and some fruits, such as apples and citrus, and vegetables, such as potatoes. Foods high in insoluble fiber are wheat bran, whole grains, cereals, seeds and the skins of many fruits and vegetables.

Psyllium fiber is the coat of the psyllium seed (either intact or comminuted), which come from plants of the Plantago genus. The seed coats can be removed and sanitized by methods known in the art, such as ethylene oxide sanitation or steam sanitation, as described in U.S. Pat. No. 4,911,889.

Additional information concerning agents used to maintain regularity of bowel movements and/or to reduce or eliminate constipation is present in *The Merck Index* (Eleventh Edition, Merck & Co., Inc., Rahway, N.J., 1989), in Goodman and Gilman's *The Pharmacological Basis of Therapeutics* (Eight Edition, Pergamon Press, New York, 1990), in J. O. Greenhalf, "Laxatives in the Treatment of Constipation in Pregnant and Breast-Feeding Mothers," *The Practitioner*, 210, 259–263 (1973), and in 21 CFR Part 334 ("Laxative Drug Products for Over-the-Counter Human Use").

The anti-constipation and regularity-maintaining agents that may be employed in the food bars of the invention should be employed in an amount that is effective for maintaining regular bowel movements and/or reducing or eliminating constipation. This quantity will vary depending upon the particular anti-constipation and regularity-maintaining agent used, but generally ranges from about 0 to about 80 weight percent of the total weight of the food bars, and preferably ranges from about 1. to about 60 weight percent, with about 2 weight percent being most preferred for polycarbophyll and about 33 weight percent being most preferred for wheat fiber and bran.

A typical dose of psyllium for Taxation purposes involves the administration of from about 3 to about 15 grams of psyllium fiber in one dose. Calcium polycarbophyll is generally administered to pregnant women, lactating women or women having childbearing potential that are attempting to become pregnant in a daily amount ranging from about 1 to about 5,000 mg, preferably ranging from about 1,250 to about 5,000 mg, with about 1,250 mg being most preferred (for each category of women).

Flax is generally administered to pregnant women, lactating women or women having childbearing potential that are attempting to become pregnant in a daily amount ranging from about 1 to about 5,000 mg, preferably ranging from about 1,000 to about 3,000 mg, with about 1,000 mg being most preferred (for each category of women). Linolenic acid is generally administered to pregnant women, lactating women or women having childbearing potential that are attempting to become pregnant in a daily amount ranging from about 1 to about 300 mg, preferably ranging from about 10 to about 200 mg, with about 100 mg being most preferred (for each category of women).

Constipation may be a sign of a serious condition that requires the diagnosis and treatment by a physician. Constipation lasting longer than one week could signify a more serious condition, such as diverticular disease of the colon, irritable bowel, or cancer of the colon. In such cases, the individuals suffering from constipation should visit a physician at the earliest possible time so that the condition can be diagnosed and properly treated.

Carbohydrates

A wide variety of carbohydrates can be employed to produce the food bars of the invention. These carbohydrates include any carbohydrates that are customary in the preparation of foods, such as ingestible monossacchardic or dissaccharidic materials, their hydrolysis products, and mixtures thereof, for example, dextrose (glucose), sucrose, fructose, lactose, maltose, galactose, sugar alcohols, such as sorbitol, mannitol and xylitol, invert sugar syrups, brown sugar, corn syrup, corn syrup solids, honey, molasses, maple syrup, and the like, which are commercially available from sources known by those of skill in the art, and mixtures thereof. Molasses, corn syrup, brown sugar and dextrose are preferred carbohydrates for use in the food bars of the invention.

The carbohydrates employed to produce the food bars of the invention generally range from about 0 to about 99 weight percent of the total weight of the food bars, and preferably range from about 1 to about 60 weight percent, with about 40 weight percent being most preferred (for pregnant women, lactating women and women having childbearing potential that are attempting to become pregnant). Low- or no-sugar food bars (as these terms are defined in the art) may be produced in accordance with the present invention.

Proteins

A wide variety of edible proteins may be employed to produce the food bars of the invention. These proteins include, for example, cereal proteins, milk proteins, egg proteins, animal proteins, vegetable proteins, whey protein, bean proteins, lactalbumin-casein coprecipitate, calcium caseinate, sodium caseinate, purified or refined grades of casein and soy proteins, peanuts, which are commercially available from sources known by those of skill in the art, and mixtures thereof. Whey protein and soy protein are the preferred proteins for use in the food bars of the invention.

The proteins employed to produce the food bars of the invention generally range from about 0 to about 80 weight percent of the total weight of the food bars, and preferably range from about 20 to about 60 weight percent, with about 40 being most preferred (for pregnant women, lactating women and women having childbearing potential that are attempting to become pregnant). Low-, no- or high-protein food bars (as these terms are defined in the art) may be produced in accordance with the present invention.

Fats

A wide variety of fats can be employed to produce the food bars of the invention. These fats include, for example, olive oil, canola oil, palm oil, coconut oil, sunflower oil, peanut oil, vegetable oil, lecithin, fish oil, cotton seed oil, soybean oil, lard, monoglycerides, diglycerides, butter, margarine, and other animal, vegetable, and marine fats, and milk fats, which are commercially available from sources known by those of skill in the art, and mixtures thereof. Vegetable oil is the preferred fat for use in the food bars of the invention.

The fats employed in the food bars of the invention generally range from about 0 to about 60 weight percent of the total weight of the food bars, and preferably range from about 1 to about 40 weight percent, with about 20 weight percent being most preferred (for pregnant women, lactating women and women having childbearing potential that are attempting to become pregnant). Low- or no-fat food bars (as these terms are defined in the art) may be produced in accordance with the present invention.

In order to obtain a good fat distribution within the mixture of ingredients used to form the food bars of the invention, fats that are solid at room temperature may be heated to a temperature ranging from about 100° F. to about 220° F., and preferably to a temperature ranging from about 160° F. to about 172° F. If the solid fat is not heated enough, it will not melt and, thus, will not mix easily with the other ingredients. However, in order to minimize off-flavors that may result from heating solid fats too long, or at too high of a temperature, or the degrading of vitamins that are mixed with the fats, solid fats should generally only be heated for a period of time, and at a temperature, that is sufficient to transform the solid fats into a liquid or semi-liquid state, and to allow the fats to properly blend with other ingredients.

Water

The amount of water employed to make the food bars of the invention generally ranges from about 0 to about 33 weight percent of the total weight of the food bars, and preferably ranges from about 0 to about 6 weight percent, with about 0 weight percent being most preferred. Water may be employed, for example, to dissolve a vitamin pre-mix that will be used to prepare food bars of the invention. When the food bars of the invention are prepared by baking, the dough from which the food bars are produced contains substantially more water than the final products, which are baked. This is not the case when the food bars are fully or partially cold formed (as defined hereinbelow).

The temperature of the water employed to produce the food bars of the invention generally should be no higher than about 130° F. In addition, the water used should be in a liquid state (i.e., not frozen). Thus, the temperature of the water employed in the process of the invention should generally range from about ambient temperature to about 130° F., with ambient temperature being most preferred.

Preservatives

One or more preservatives, such as sodium benzolate, ascorbyl palmitate, sorbic acid, BHT or EDTA may, optionally, be employed in the food bars of present invention, for example, to increase the shelf life of the final products. The preservatives employed in the food bars of the invention generally range from about 0 to about 5 weight percent of the total weight of the food bars, and preferably range from about 1 to about 3 weight percent, with about 1 weight percent being most preferred (for pregnant women, lactating women and women having childbearing potential that are attempting to become pregnant).

Sodium benzolate is a preservative that prevents the oxidation, chelation or hydrolysis of the ingredients contained in the food bars of the invention and, thus, diminishes the capacity of the food bars to lose vitamin or mineral potency, or to develop off flavors.

Bitterness and Off-Taste Masking Agents

Agents that mask the bitterness or off taste of ingredients other than DHA that may also be present in the food bars of the invention, such as vitamins and/or minerals (particularly the B vitamins, which have strong aromas and tastes, minerals, which often have unpleasant metallic tastes, and herbs and botanicals, such as Kava Kava and Ginko Biloba, which have strong bitter tastes), and that are safe for pregnant or lactating women, and their developing fetuses or babies, may, optionally, be employed in the food bars of present invention. A wide range of bitterness and off-taste masking agents in various forms (liquid, powder or solid) that may be employed in the food bars of the invention may be obtained from sources known by those of skill in the art, such as Flavor Savor, Inc. (Franklin Park, Ill.). Some of the agents that are available from Flavor Savor, Inc., include No. 598.605/T, No. 597.492/A, No. 598.876/TP05.51, No. 598.118/AP10.51, No. 861.016/TD10.90 and No.861.472/TD10.90.

The bitterness and off-taste masking agents employed in the food bars of the invention generally range from about 0 to about 3 weight percent of the total weight of the food bars, and preferably range from about 0.05 to about 2 weight percent, with about 0.5 weight percent being most preferred (for pregnant women, lactating women and women having childbearing potential that are attempting to become pregnant). It is preferable that a 60 g food bar of the invention contain about 1,250 mg of a bitterness or off-taste masking agent.

Binders

Binders that are safe for consumption by pregnant women, lactating women and women having childbearing potential that are attempting to become pregnant, such as polyvinyl alcohol or methylcellulose may, optionally, be employed in the food bars of present invention to ensure a uniform consistency of the food bars. The binders employed in the food bars of the invention generally range from about 0 to about 10 weight percent of the total weight of the food bars, and preferably range from about 1 to about 7 weight percent, with about 1 weight percent being most preferred (for all three categories of women). It is preferable that a 60 g food bar of the invention contain about 1,250 mg of a binder.

Other Optional Ingredients

It is contemplated that a wide variety of other edible natural or artificial flavors and ingredients may, optionally, be employed to produce the food bars of the invention. Such ingredients include any edible substance that would not endanger the health of the pregnant women, lactating women or women having childbearing potential that are attempting to become pregnant consuming the food bars, or the health of the developing fetuses or babies, and which either alone, or in combination with other ingredients, imparts a desirable taste, color, nutritional and/or other benefit to the food bars being manufactured. The amount and type of these ingredients that may be employed to produce the food bars of the invention depend upon the desired color, flavor, nutritional content or other benefit of the final food bars being produced. Examples of optional ingredients that may be incorporated into the food bars of the invention include, for example, vanilla or cocoa liquor, cocoa powder, mocha, artificial flavors, natural flavors, various fruit flavors, such as strawberry, lemon, orange, grape or pineapple, or any such flavor as is normally used in food products, caramel, yogurt, whole milk, skim milk, buttermilk, concentrated milk products (condensed or evaporated milk), dried milk products, nonfat milk powder, dry whole milk, modified whole milk, egg products, including egg whites and egg yolks, flour ingredients, such as wheat flour, rye flour, corn flour, cottonseed meal or sorghum flour, in either bleached or unbleached form, spices, such as cinnamon or nutmeg, salt, antioxidants, nuts, granola (whole grain rolled oats, rolled whole wheat, sugar, partially hydrogenated soybean and/or cottonseed oil, whole wheat flour, molasses, honey, cultured whey, soy lecithin and natural flavor), any of the components of granola, cereal, oats, wheat, corn, rice, rice crisp, soy, herbs, such as Ginko or Echinacea, sodium benzolate, para-aminobenzoic acid, inositol, lutein, vanadium, boron, nickel, silicon, tin, phytochemicals, isoflavonoids, omega 3 and 6 fatty acids, essential and non-essential amino acids, bioflavonoids, such as quercetin and rutin NF, emulsifiers, citric acid, artificial sweeteners (aspartame, acesulfame, saccharin, cyclamate), and pieces of commercially-available candy bars. All of these optional ingredients are commercially available from sources known by those of skill in the art.

The most preferred quantity for use in the food bars of the invention for pregnant women, lactating women and women having childbearing potential that are attempting to become pregnant of para-aminobenzoic acid is 15 mg, of inositol is 10 mcg, of lutein is 250 mcg, of vanadium is 10 mcg, of boron is 150 mcg, of nickel is 5 mcg, of silicon is 2 mg and of tin is 10 mcg.

If a flour component is employed to produce the food bars of the invention, such flour component will generally range from about 0 to about 90 weight percent of the total weight of the food bars, and preferably ranges from about 0 to about 45 weight percent, with about 0 to about 30 weight percent being most preferred.

Method of Production

In another aspect, the present invention provides a method for preparing food bars for consumption by pregnant women, lactating women and women having childbearing potential that are attempting to become pregnant that contain one or more vitamins and/or minerals, including calcium in an amount above 1,000 mg, DHA, one or more DHA taste-masking agents and, optionally, one or more anti-constipation and regularity-maintaining agents. Although the food bars of the invention may be prepared according to any procedure known in the art for preparing food bars, it is preferred that the food bars be fully cold-formed (be prepared without the use of any heat) or partially cold-formed (be prepared using one or more heating steps, such as using a jacketed kettle, but without the use of any baking steps).

FIG. 1. depicts a preferred embodiment of a process for preparing the food bars in accordance with the present invention. Referring to FIG. 1, separately, a binder for the base of the food bars is produced 10, the base of the food bars is produced 12, and a top layer for the food bars is produced 14. The base of the food bars is then extruded 16 to produce bars of the desired shape and size. A top layer is then placed on top of each of the extruded bars 18, and the resulting bars are coated on the top, bottom and all sides with an outside coating 20. The resulting food bars of the invention are then packaged 22.

Production of Binder for Base of Food Bars

Oil-soluble vitamins and/or minerals, such as Vitamin A, Vitamin D and Vitamin E, and one or more DHA taste-masking agents, such as maltodextrin, are preferably dissolved in a fat, such as sunflower oil, that has been heated to a temperature ranging from about 160° F. to about 180° F., and preferably about 172° F. Any convenient piece of equipment, such as a stove top, may be used to heat the fat. If the fat is a solid, and it is not heated enough, the fat will not properly blend with the oil-soluble vitamins. However, it the fat is heated too much, the heat will degrade the vitamins being dissolved therein. The vitamins are mixed with the fat until a uniform blend of the fat and vitamins is achieved, which generally takes from about 10 to about 30 minutes, and depends upon the size and speed of the blender being employed. Also, some oil-soluble vitamins dissolve more slowly than others. Any conventional piece of equipment for blending ingredients together may be used to blend the fat with the oil-soluble vitamins. In order to prevent the heat from degrading the vitamins, the uniform blend of oil-soluble vitamins and fat should then be cooled to a temperature ranging from about 135° F. to about 150° F. and preferably to about 142° F. Any convenient method for cooling may be employed. If the uniform blend is cooled too much, it will solidify and, thus, will not mix well with other ingredients used to prepare the food bars.

Production of Base of Food Bars

Crisp rice (or other similar materials, such as granola or cracked wheat) is blended with DHA and, optionally, with an anti-constipation and regularity-maintaining agent, such as calcium polycarbophyll, until a uniform blend of the ingredients is achieved without breaking the crisp rice down. This generally takes from about 5 to about 60 minutes, and depends upon the size and speed of the blender being employed. Overmixing of the crisp rice with the DHA and optional anti-constipation and regularity-maintaining agent will result in the breaking down of the crisp rice, which is not desirable. Any conventional piece of equipment for blending ingredients together may be used to blend the crisp rice with the DHA and anti-constipation and regularity-maintaining agent, such as a day mixer. The amount of crisp rice (or other similar materials) that should be used is an amount that will, when blended with other ingredients employed to form the base of the food bars, permit the formation of a food bar base having a consistency that may be readily extruded into bars of a desired shape and size. A person of skill in the art may readily determine this amount.

The binder for the base of the food bars should then be slowly added to the blender, while mixing is occurring. Mixing should continue until another uniform blend is achieved. This will generally take from about 5 to about 60 minutes, depending upon the size and speed of the blender being employed. The resulting mixture should then be cooled to a temperature ranging from about 135° F. to about 150° F., and preferably to about 142° F. Any convenient method for cooling may be employed.

Production of Top Layer of Food Bars

A top layer, which is preferably a caramel blend, is preferably prepared for placement onto the top of the base of the food bars. Preferably, a milk source (preferably from about 5 to about 20 weight percent of the food bars), such as liquid skim milk, is mixed with a sweetener (preferably from about 40 to about 70 weight percent of the food bars), such as liquid sucrose and/or corn syrup, and/or one or more DHA taste-masking agents, such as high fructose corn syrup, a fat, such as palmolein oil (preferably from about 5 to about 20 weight percent of the food bars), and one or more flavor ingredients (preferably from about 0.5 to about 2 weight percent of the food bars) while the mixture is heated to a temperature ranging from about 220° F. to about 260° F., and preferably about 240° F., in, for example, a conventional, fixed-speed jacketed kettle that has a high shear mixer and sweep agitator with side wall scrapers placed therein. The mixture should be heated and stirred until the solids content of the mixture becomes between about 85% and about 92%, preferably about 90.5%. The mixture is then cooled to a temperature ranging from about 135° F. to about 150° F., and preferably to about 142° F., a temperature which will allow the mixture to be pourable (not solid), but which is not so high that it will degrade vitamins being mixed therewith. Any convenient method for cooling may be employed.

Water-soluble vitamins and/or minerals, such as Vitamin C, Calcium (in an amount to provide the food bar products with a quantity that is greater than 1,000 mg), Iron, and Folic Acid, are then added to the cooled mixture, and the ingredients are mixed until a uniform blend of the ingredients is achieved, which generally takes from about 10 to about 60 minutes, and depends upon the size and speed of the blender being employed. The resulting uniform blend is then maintained at a temperature ranging from about 135° F. to about 150° F., and preferably about 140° F.

Extrusion

The base of the food bars is then extruded to form individual bars of the desired shape and size. The product may be extruded with any suitable extruding apparatus known by those of skill in the art. However, it is preferred that the product be extruded with an NID Extruder.

Placement of Top Layer onto Resulting Bars

The top layer of the food bars is then preferably placed into a hopper of a top-coating machine. The individual bars that have been extruded are then preferably passed through the top coating machine, and a desired quantity of the top layer, which generally ranges from about 5 to about 50 weight percent of the food bars, with about 20 weight percent being preferred, is dispensed onto the top of each bar by the top coating machine. The resulting bars are then cooled to a temperature ranging from about 50° F. to about 90° F., and preferably about 85° F. Any convenient method for cooling may be employed.

Placement of Outside Coating over Resulting Bars

A commercially-available coating, such as a chocolate coating, which may contain one or more DHA taste-masking agents, such as chocolate, unsweetened chocolate and/or cocoa, and which is preferably an artificial chocolate confectioners coating (Kraft Foods, Inc., Northfield, Ill.), is preferably placed into the hopper of a cascading coating machine; and is allowed to recirculate for several minutes, such as twenty minutes. The bars that have had a top coating placed on the top thereof are preferably then passed through the coating machine, and a desired quantity of the chocolate coating, which generally ranges from about 5 to about 30 weight percent of the food bars, with about 15 weight percent being preferred, is placed upon the top, bottom and sides of each bar. The resulting food bars are then cooled to a temperature ranging from about 50° F. to about 75° F., and preferably about 60° F. Any convenient method for cooling, such as passing the bars through a cooling tunnel, may be employed. It is preferable that food bars that have been coated with real chocolate be cooled to a temperature well below the melting point of real chocolate (about 110° F.), and that food bars that have been coated with an artificial chocolate confectioners coating be cooled to a temperature well below the melting point of the artificial chocolate confectioners coating (about 125° F.).

Irradiation

Prior to packaging the food bars of the invention, the food bars may, optionally, be irradiated in order to kill microorganisms that may have contaminated the food bars during their preparation. Such irradiation should not diminish the effectiveness of the vitamins, minerals or anti-constipation and regularity-maintaining agents contained therein.

Packaging

The resulting food bars may then be packaged in any manner known by those of skill in the art for packaging food bars. The preferred method of packing the food bars is by hermetically sealing each food bar within a film having oxygen barrier properties, such as a foil laminate, purging the inner space of the wrapper with nitrogen (to create a nitrogen blanket), placing a group of the wrapped food bars in an aluminum can, having the air present in the aluminum can removed with a vacuum, and replacing the removed air with nitrogen. When packaged in this manner, the food bars of the invention have a shelf life at normal room temperature (from about 59° F. to about 86° F.) of about two years. However, food bars of the invention that have chocolate coatings made from real chocolate should be refrigerated.

Composition of Final Product

The food bars of the invention may be in one unit (i.e., they will not contain a series of layers), or they may contain a series of two, three, four, five, six or more layers.

The food bars of the invention may be made of any desirable weight, but will generally range in weight from about 5 to about 100 g, and will preferably range in weight from about 10 to about 60 g, with about 50 g being most preferred (for pregnant women, lactating women and women having childbearing potential that are attempting to become pregnant).

The food bars of the invention may be of any desirable shape, such as circular, oval, rectangular, square, triangular, round, flat or cylindrical. However, they are preferably rectangular. They may be of any desirable size, but will generally range in size from about 0.5 to about 12 inches in length, from about 0.5 to about 12 inches in width and about 0.2 to about 4 inches in thickness, and preferably range in size from about 1 to about 6 inches in length, from about 0.5 to about 2 inches in width and from about 0.2 to about 2 inches in thickness, with about 4.75 inches in length, about 1.5 inches in width and about 0.625 inches in thickness being most preferred. The food bars are preferably of such dimensions that one serving of one bar provides all of the daily requirements for a pregnant woman, a lactating woman or a woman having childbearing potential that is attempting to become pregnant of vitamins, minerals and other nutrients, and, optionally, a sufficient amount of an anti-constipation and regularity-maintaining agent to permit these women to have more regular and comfortable bowel movements. However, such nutrients and anti-constipation and regularity-maintaining agents may be distributed throughout a series of two, three four, five, six or more bars to be consumed per day by such women. In addition, the food bars can have a frangibly segmented structure. The segments can be formed by indentations, perforations or the like, which serve to differentiate separate parts or subgroups of parts from one another.

The carbohydrate content of the food bars of the invention generally ranges from about 0 to about 99 weight percent of the total weight of the food bars, and preferably ranges from about 1 to about 60 weight percent, with about 40 weight percent being most preferred (for pregnant women, lactating women and women having childbearing potential that are attempting to become pregnant).

The protein content of the food bars of the invention generally ranges from about 0 to about 80 weight percent of the total weight of the food bars, and preferably ranges from about 20 to about 60 weight percent, with about 40 weight percent being most preferred (for pregnant women, lactating women and women-having childbearing potential that are attempting to become pregnant).

The fat content of the food bars of the invention generally ranges from about 0 to about 60 weight percent of the total weight of the food bars, and preferably ranges from about 1 to about 40 weight percent, with about 20 weight percent being most preferred (for pregnant women, lactating women and women having childbearing potential that are attempting to become pregnant).

The moisture content of the food bars generally ranges from about 0 to about 3 weight percent of the total weight of the food bars, and preferably ranges from about 0 to about 1.5 weight percent, with about 0 weight percent being most preferred. Because water can cause the food bars of the invention to decompose, it is preferred that the food bars contain no moisture.

The amount of calories that a particular food bar of the invention will contain will vary widely depending upon a number of factors, such as the ingredients employed to produce the bars, the quantities of those ingredients used, and the weight and size of the bars. However, it is preferred that the food bars of the invention range from about 1 to about 1500 calories, with from about 10 to about 600 calories being preferred, and about 200 calories being most preferred.

Methods for Supplementing Dietary Requirements

In a further aspect, the present invention provides a method for supplementing the dietary requirements of pregnant women, lactating women and women having childbearing potential that are attempting to become pregnant and, consequently, the nutrition of their developing fetuses and babies. This method comprises administering one or more of the food bars of the present invention to a pregnant woman per day throughout pregnancy, to a lactating woman per day throughout the period of lactation, or to a woman having childbearing potential that is attempting to become pregnant per day until she becomes pregnant (and then throughout pregnancy and lactation). If a food bar is prepared that contains all of the vitamins, minerals and other nutritional supplements recommended for consumption by pregnant women, lactating women or women of childbearing potential that are attempting to become pregnant in the largest daily quantity that is safe for these women, and for their developing fetuses or babies, then these women would consume one entire food bar per day (either all at one time, or divided into two, three, four, five, six or more parts). If a food bar is prepared that contains all of the vitamins, minerals and other nutritional supplements recommended for consumption by pregnant women, lactating women or women of childbearing potential that are attempting to become pregnant, but only one half of the largest daily quantity that is safe for these women, and for their developing fetuses or babies, then these women would consume two entire food bars per day (either together at once, or at different times during the day). If a food bar is prepared that contains all of the vitamins, minerals and other nutritional supplements recommended for consumption by pregnant women, lactating women or women of childbearing potential that are attempting to become pregnant, but only one third of the largest daily quantity that is safe for these women, and for their developing fetuses or babies, then these women would consume three entire food bars per day (either together at once, or at different times during the day). A person of ordinary skill in the art can readily determine the appropriate daily dosage of food bars of the invention in relation to the type and quantity of vitamins, minerals and other nutritional supplements that may be present in the food bars. For pregnant women that experience morning sickness, it would be preferable to eat several bite-sized food bars throughout the day than to eat one larger food bar all at one time during the day.

The following examples describe and illustrates the methods for the preparation of the food bars of the present invention. The examples are intended to be merely illustrative of the present invention, and not limiting thereof in either scope of spirit. Those of skill in the art will readily understand that variations of certain of the conditions and/or steps employed in the procedures described in the examples can be used to prepare and test these food bars.

All of the materials and equipment employed in the examples, and generally employed to make and use the food bars of the present invention, are commercially available from sources known by those of skill in the art.

EXAMPLE 1

Preparation of Pre-Natal Chocolate-Coated, Orange-Flavored Caramel and Rice Crisp Food Bars Containing an Anti-Constipation and Regularity-Maintaining Agent 16,666 pre-natal chocolate-coated, orange-flavored caramel and rice crisp food bars were prepared from a 1,000 kg batch of material, using a partial cold-formed method. Each of the food bars weighed 60 g, and contained the vitamins, minerals, and other nutrients, and the quantities thereof, set forth below, including the anti-constipation and regularity-maintaining agent calcium polycarbophyll.

| Vitamin | Quantity |
| --- | --- |
| Vitamin A | 5000 I.U. |
| Vitamin $B_1$ (Thiamin) | 3 mg |
| Vitamin $B_2$ (Riboflavin) | 3.4 mg |
| Vitamin $B_3$ (Niacin) | 20 mg |
| Vitamin $B_6$ (Pyridoxine) | 10 mg |
| Vitamin $B_9$ (Folic Acid) | 1 mg |
| Vitamin $B_{12}$ (cyanocobalamine) | 12 mcg |
| Biotin | 30 mcg |
| Vitamin C | 120 mg |
| Vitamin D | 400 I.U. |
| Vitamin E | 30 I.U. |
| Mineral | |
| Calcium | 1300 mg |
| Iron | 27 mg |
| Pantothenic Acid | 10 mg |
| Iodine | 150 mcg |
| Magnesium | 400 mg |
| Zinc | 25 mg |
| Selenium | 70 mcg |
| Copper | 2 mg |
| Manganese | 5 mg |
| Chromium | 25 mcg |
| Molybdenum | 25 mcg |
| Other | |
| DHA | 300 mg |
| Polycarbophyll (as Calcium Polycarbophyll) | 1000 mg |

Part I—Production of Binder for the Base of the Food Bars

Liquid sucrose (67.5% solids) (181.5631 kg) and maltodextrin 17DE (dextro equivalent) (78% solids) (64.1 kg) were added to a first jacketed kettle (Kettle A), which had a conventional, fixed-speed, high shear mixer and sweep agitator with side wall scrappers placed therein. The liquid sucrose and maltodextrin were then heated to 240° F. while stirred together with the sweep agitator, and this temperature was maintained until the solids content of the mixture reached about 88%. The temperature was then reduced to 172° F. by adjusting the temperature control present on the kettle (to have cool water run through the jacket of the kettle).

Separately, sunflower oil (33.332 kg) was placed into a small container and heated to 172° F. The following ingredients were then added to the heated sunflower oil while mixing slowly: lecithin (0.99996 kg), ascorbyl palmitate (3.3332 kg), propyl gallate (0.0067 kg), palm oil (3.3332 kg), myverol oil (0.0333 kg) and a pre-mix of oil-soluble vitamins (1.0 kg) containing (per 60 mg) a quantity of Vitamin A (Vitamin A Palmitate), Vitamin A (Beta Carotene), Vitamin D (Cholecalciferol) and Vitamin E (d,l Alpha Tocopheryl Acetate) to provide the minimum activity of these vitamins for the quantities of these vitamins described hereinabove, and sunflower oil, to have the combined ingredients total 1.0 kg. The ingredients were mixed until a uniform blend was obtained.

The material present in Kettle A was then mixed with the high shear mixer at the fixed speed in the down mode to form a vortex. The following ingredients were then added into the vortex present in Kettle A: cocoa powder (1.0 kg), reduced minerals whey powder (49.998 kg), Flavor Savor No. 597.492A (0.3333 kg), orange beck flavor 10342 (0.6666 kg) (Danisco A/S, Copenhagen, Denmark), EDTA (33.332 kg), citric acid (0.0667 kg) and the sunflower oil uniform blend described above. The high shear mixer was then adjusted to the up mode, and mixing was continued until a uniform blend was formed. The mixture was then cooled to 142° F., and this temperature was maintained.

Part II—Production of Crisp Rice Mixture

Crisp rice (279.1555 kg) was added to a fixed-speed jacketed ribbon blender. The blender was then started, and calcium polycarbophyll (20.8325 kg) and DHA Powder (15% DHA) (33.332 kg) were slowly added to the crisp rice while the blender was mixing. These ingredients were mixed for about 10 minutes, until a uniform blend was obtained. The mixture from Part I was then added to the ribbon blender slowly, while mixing was occurring. The mixing continued until another uniform blend was produced. The resulting mixture was cooled to 142° F. by adjusting the temperature control present on the mixer (to have cool water run through the jacket of the mixer). This temperature was then maintained.

Part III—Production of Caramel Blend

The following ingredients were added to another jacketed kettle (Kettle B), which also had a conventional, fixed-speed, high shear mixer and sweep agitator with side wall scrappers placed therein: corn syrup 43 DE (80.7% solids) (23.6257 kg), liquid sucrose (67.5% solids) (27.1594 kg), fructose powder (8.333 kg), sodium chloride (0.6 kg), liquid skim milk (16.666 kg) and palmolein oil (refined, blended and deodorized) (16.666 kg). The ingredients were heated to 240° F. while they were stirred together with the sweep agitator by adjusting the temperature control present on the kettle (to have steam run through the jacket of the kettle). The mixture was stirred and heated at 240° F. until the solids content of the mixture reached about 90.5%. The temperature of the mixture was then reduced to 140° F. by adjusting the temperature control present on the kettle (to have cool water run through the jacket of the kettle). Vanilla flavor extract (0.3333 kg) was then added to the kettle, and the ingredients were mixed for about 10 minutes.

A pre-mix (99.996 kg) containing (per 6,000 mg) a quantity of the following water-soluble vitamins and minerals to provide the minimum activity of these vitamins and minerals for the quantities of these vitamins and minerals described hereinabove were slowly added to Kettle B: Thiamin (Thiamin Mononitrate), Riboflavin, Niacin (Niacinamide), Pyridoxine (Pyridoxine Hydrochloride), Folic Acid, Vitamin $B_{12}$ (Cyanocobalamine), Biotin, Vitamin C (Ascorbyl Acid), Calcium (Calcium Carbonate), Iron (Ferrous Fumarate), Pantothenic Acid (d-Calcium Pantothenate), Iodine (Potassium Iodide), Magnesium (Magnesium Oxide), Zinc (Zinc Oxide), Selenium (Sodium Selenate), Copper (Cupric Oxide), Manganese, (Manganese Sulfate), Chromium (Chromium Chloride), Molybdenum (Sodium Molybdate) and Maltodextrin, QS to make 6,000 mg. The ingredients in Kettle B were mixed for about 20 minutes, until a uniform blend was obtained. The resulting uniform blend was maintained at a temperature of 140° F.

Part IV—Extrusion of Crisp Rice Mixture

The crisp rice mixture resulting from Part II was transferred from the ribbon blender to an extruder, and the mass was extruded, and then cut into approximately 40 g bars. The bars were then passed through a cooling tunnel, and cooled to below about 140° F.

Part V—Top Coating of Caramel Blend

The caramel blend resulting from Part III was placed into the hopper of a top-coating machine. The crisp rice bars resulting from Part IV were then passed through the top coating machine, and approximately 12 g of caramel blend was dispensed onto the top of each bar by the top coating machine. The resulting bars were then passed through a cooling tunnel, and cooled to about 85° F.

Part VI—Artificial Chocolate Confectioners Coating

Artificial chocolate confectioners coating (Kraft Foods, Inc., Northfield, Ill.) (133.328 kg) was placed into the system hopper of a cascading coating machine and allowed to recirculate for about 20 minutes. The bars resulting from Part V were then passed through the machine, and approximately 8 g of artificial chocolate confectioners coating was added to the top, bottom and sides of each bar. The resulting food bars were then passed through a cooling tunnel, and cooled to about 60° F.

Part VII—Packaging

The food bars resulting from Part VI were placed in a packaging line, where they were each individually wrapped in a film having oxygen barrier properties. Prior to sealing the wrapper of each bar, the inner space of the wrapper for each bar was purged with nitrogen. Then, sets of fourteen bars were placed into separate aluminum cans. The cans were then passed into a vacuum packer that replaced air with nitrogen. Each can was then hermetically sealed and labeled, and kept at room temperature. The bars produced in this Example did not need to be refrigerated (to maintain freshness or to prevent the outside coating from melting).

The resulting food bars each contained a caramel center, in which the vitamins and minerals were present, and were slowly released therefrom, and had an artificial chocolate confectioners coating present thereon. The food bars each weighed about 60 g, and had about 205 calories. They each had a carbohydrate content of 30 g, a protein content of 10 g, a fat content of 5 g, and a cholesterol content of 22 mg. They were each rectangular with a flat bottom and a slightly domed top, and 4 and ¾ inches long, 1 and ½ inches wide, and ⅝ of an inch thick. None of the food bars contained any marshmallow, taurine or flour. Each of the food bars contained the following components:

| Component | Mg/Food Bar |
| --- | --- |
| Liquid Sucrose (67.5% Solids) | 8,453.600 mg |
| Maltodextrin 17 DE (78% Solids) | 3,000.000 mg |
| Sunflower Oil | 2,000.000 mg |
| Lecithin | 60.000 mg |
| Ascorbyl Palmitate | 200.000 mg |
| Propyl Gallate | 0.400 mg |
| Palm Oil | 200.000 mg |
| Myverol Oil | 2.000 mg |

-continued

| Component | Mg/Food Bar |
|---|---|
| 1st Vitamin/Mineral Pre-Mix (Part I) | 60.000 mg |
| Cocoa Powder | 60.000 mg |
| Reduced Minerals Whey Powder | 3,000.000 mg |
| Flavor Savor 597.492/A | 20.000 mg |
| Orange Beck Flavor 10342 | 40.000 mg |
| EDTA | 2,000.000 mg |
| Citric Acid | 4.000 mg |
| Water | 3,200;000 mg |
| Crisped Rice | 16,750.000 mg |
| Calcium Polycarbophyll | 1,250.000 mg |
| DHA Powder (15% DHA) | 2,000.000 mg |
| Corn Syrup | 1,144.000 mg |
| Fructose Powder | 500.000 mg |
| Sodium Chloride | 36.000 mg |
| Liquid Skim Milk | 1,000.000 mg |
| Palmolein Oil | 1,000.000 mg |
| Vanilla Flavor Extract | 20.000 mg |
| 2nd Vitamin/Mineral Pre-Mix (Part III) | 6,000.000 mg |
| Artificial Chocolate Confectioner's Coating | 8,000.000 mg |
| Total | 60,000.000 mg (60 g) |

One of these food bars may be administered per day to a pregnant woman. The food bar may be consumed all at one time, or may be divided into varying portions, with all of the portions eaten within the same day. Food bars for lactating women, or for women having childbearing potential that are attempting to become pregnant, can also be produced according to the methods described in this Example.

EXAMPLE 2

Preparation of Pre-Natal Chocolate-Coated Orange-Flavored Caramel and Rice Crisp Food Bars not Containing an Anti-Constipation and Regularity-Maintaining Agent The same procedure described in Example 1 was carried out in Example 2, with the exceptions that the anti-constipation and regularity-maintaining agent calcium polycarbophyll was not used in the production of the crisp rice mixture, and additional crisp rice (20.8325 kg more, making a total of 299.9880 kg of crisp rice) was employed in the production of the crisp rice mixture. No anti-constipation and regularity-maintaining agent was employed during the production of the food bars, or was present in the food bars produced in this example. Each of the food bars contained the following components:

| Component | Mg/Food Bar |
|---|---|
| Liquid Sucrose (67.5% Solids) | 8,453.600 mg |
| Maltodextrin 17 DE (78% Solids) | 3,000.000 mg |
| Sunflower Oil | 2,000.000 mg |
| Lecithin | 60.000 mg |
| Ascorbyl Palmitate | 200.000 mg |
| Propyl Gallate | 0.400 mg |
| Palm Oil | 200.000 mg |
| Myverol Oil | 2.000 mg |
| 1st Vitamin/Mineral Pre-Mix (Part I) | 60.000 mg |
| Cocoa Powder | 60.000 mg |
| Reduced Minerals Whey Powder | 3,000.000 mg |
| Flavor Savor 597.492/A | 20.000 mg |
| Orange Beck Flavor 10342 | 40.000 mg |
| EDTA | 2,000.000 mg |
| Citric Acid | 4.000 mg |
| Water | 3,200.000 mg |
| Crisped Rice | 18,000.000 mg |
| DHA Powder (15% DHA) | 2,000.000 mg |

-continued

| Component | Mg/Food Bar |
|---|---|
| Corn Syrup | 1,144.000 mg |
| Fructose Powder | 500.000 mg |
| Sodium Chloride | 36.000 mg |
| Liquid Skim Milk | 1,000.000 mg |
| Palmolein Oil | 1,000.000 mg |
| Vanilla Flavor Extract | 20.000 mg |
| 2nd Vitamin/Mineral Pre-Mix (Part III) | 6,000.000 mg |
| Artificial Chocolate Confectioner's Coating | 8,000.000 mg |
| Total | 60,000.000 mg (60 g) |

EXAMPLE 3

Preparation of Pre-Natal Chocolate-Smoothie Bars Containing an Anti-Constipation and Regularity-Maintaining Agent Pre-natal food bars containing the following ingredients were prepared in the manner described in Example 1: high fructose corn syrup, cocoa powder, honey, whey protein concentrate, sugar, milk mineral concentrate, rice flour, palm kernal oil, whey protein isolate, corn syrup, casein, oligofructose, sorbitol, unsweetened chocolate, water, ground almonds, fructose, calcium polycarbophyll, natural flavors, lactose, mono- and diglycerides, glycerine, whey, maltodextrins, magnesium oxide, lecithin, dextrose, canola oil, sunflower oil, ascorbic acid, DHA, soya bean oil, copper, modified palm/palm kernal oil, biotin, salt, niacinamide, zinc oxide, thiaminmononitrate, cholecalciferol, malt, potassium iodide, cyanocobalamin, soy protein isolate, chromium chloride, folic acid, citric acid, sodium molybdate and sodium selenite.

Each of the resulting food bars contained 220 calories, 7 g of total fat, 4.5 g of saturated fat, 20 mg of cholesterol, 120 mg of sodium, 220 mg of potassium, 30 g of total carbohydrate, 3 g of dietary fiber, 18 g of sugars and 10 g of protein, and contained the following percent daily values of vitamins and minerals based upon a 2,000 calorie diet:

| | |
|---|---|
| Vitamin A 100% | Vitamin C 100% |
| Calcium 120% | Iron 110% |
| Vitamin D 100% | Vitamin E 110% |
| Vitamin K 100% | Thiamin 100% |
| Riboflavin 110% | Niacin 100% |
| Vitamin $B_6$ 100% | Folate 100% |
| Vitamin $B_{12}$ 110% | Biotin 100% |
| Pantothenic Acid 100% | Phosphorus 50% |
| Iodine 100% | Magnesium 100% |
| Zinc 110% | Selenium 100% |
| Copper 100% | Manganese 100% |
| Chromium 100% | Molybdenum 100%. |

EXAMPLE 4

Preparation of Nougat Caramel Bars Containing 300 mg of DHA

Food bars containing the following ingredients were prepared in the manner described in Example 1 corn syrup, sugar, wheat bran, palm and palm kernal oils, soy protein isolate, honey, milk protein concentrate, calcium carbonate, glycerine, skim milk powder, whey protein isolate, water, high fructose corn syrup, cocoa powder (alkalized), rice syrup, mono- and diglycerides, vegetable oil, magnesium oxide, frutcose, rice flour, whey, almond pieces, natural flavors, calcium caseinate, lecithin, salt, ascorbic acid, maltodextrins, canola oil, copper gluconate, di-alpha-tocopheryl acetate, oligofructose, ferrous fumarate, soy bean oil, biotin, whey protein concentrate, niacinamide, zinc oxide, beta-carotene, calcium pantothenate, vitamin A palmiate, phytonadione, pyridoxine hydrochloride, manganese sulphate, riboflavin, mixed tocopherols, thiamin mononitrate, potassium iodide, folic acid, cyanocobalamin, chromium chloride, sodium molybdate, citric acid, sodium selenite and DHA.

Each of the resulting food bars weighed about 60 g, and contained 230 calories, 8 g of total fat, 6 g of saturated fat, 0 mg of cholesterol, 140 mg of sodium, 150 mg of potassium, 32 g of total carbohydrate, 3 g of dietary fiber, 21 g of sugars, 10 g of protein, 6 g of wheat bran and 300 mg of DHA, and contained the following percent daily values of vitamins and minerals based upon a 2,000 calorie diet:

| Vitamin A | 100% | Vitamin C | 100% |
|---|---|---|---|
| Calcium | 130% | Iron | 110% |
| Vitamin D | 0% | Vitamin E | 110% |
| Vitamin K | 100% | Thiamin | 100% |
| Riboflavin | 100% | Niacin | 100% |
| Vitamin $B_6$ | 100% | Folate | 250% |
| Vitamin $B_{12}$ | 100% | Biotin | 100% |
| Pantothenic Acid | 100% | Phosphorus | 15% |
| Iodine | 100% | Magnesium | 100% |
| Zinc | 100% | Selenium | 100% |
| Copper | 100% | Manganese | 110% |
| Chromium | 100% | Molybdenum | 100%. |

EXAMPLE 5

Preparation of Nougat Caramel Bars Containing 350 mg of DHA

Food bars containing the following ingredients were prepared in the manner described in Example 1: corn syrup, sugar, wheat bran, high fructose corn syrup, palm and palm kernal oils, honey, milk protein concentrate, glycerine, calcium lactate, calcium carbonate, soy protein isolate, skim milk powder, water, whey protein isolate, cocoa powder (alkalized), rice syrup, gelatine, algal oil, mono- and diglycerides, magnesium oxide, rice flour, starch, natural flavors, almond pieces, calcium caseinate, lecithin, salt, ascorbic acid, maltodextrins, canola oil, copper gluconate, di-alpha-tocopheryl acetate, oligofructose, ferrous fumarate, soy bean oil, biotin, niacinamide, zinc oxide, beta-carotene, calcium pantothenate, vitamin A palmiate, phytonadione, pyridoxine hydrochloride, manganese sulphate, riboflavin, mixed tocopherols, thiamin mononitrate, sodium ascorbate, potassium iodide, folic acid, cyanocobalamin, chromium chloride, sodium molybdate, citric acid, sodium selenite, ascorbyl palmitate and DHA.

Each of the resulting food bars weighed about 65 g, and contained 240 calories, 8 g of total fat, 6 g of saturated fat, 0 mg of cholesterol, 105 mg of sodium, 140 mg of potassium, 36 g of total carbohydrate, 3 g of dietary fiber, 24 g of sugars, 8 g of protein, 6 g of wheat bran and 350 mg of DHA, and contained the following percent daily values of vitamins and minerals based upon a 2,000 calorie diet:

| Vitamin A | 100% | Vitamin C | 100% |
|---|---|---|---|
| Calcium | 130% | Iron | 100% |
| Vitamin D | 0% | Vitamin E | 100% |
| Vitamin K | 100% | Thiamin | 100% |
| Riboflavin | 100% | Niacin | 100% |
| Vitamin $B_6$ | 100% | Folate | 240% |
| Vitamin $B_{12}$ | 100% | Biotin | 100% |
| Pantothenic Acid | 100% | Phosphorus | 15% |
| Iodine | 100% | Magnesium | 100% |
| Zinc | 100% | Selenium | 100% |
| Copper | 100% | Manganese | 110% |
| Chromium | 100% | Molybdenum | 100%. |

While the present invention has been described herein with some specificity, and with reference to certain preferred embodiments thereof, those of ordinary skill in the art will recognize numerous variations, modifications and substitutions of that which has been described which can be made, and which are within the scope and spirit of the invention. It is intended that all of these modifications and variations be within the scope of the present invention as described and claimed herein, and that the invention be limited only by the scope of the claims which follow, and that such claims be interpreted as broadly as is reasonable.

Throughout this application, various books, patents and other publications have been cited. The entireties of each of these books, patents and publications are hereby incorporated by reference herein.

What is claimed is:

1. A food bar comprising:
   (a) one or more vitamins and minerals recommended for consumption by pregnant women, lactating women or women of childbearing potential that are attempting to become pregnant in an amount that is effective for enhancing the nutrition of pregnant women, lactating women or women of childbearing potential that are attempting to become pregnant, and that is not harmful to developing fetuses or breast-feeding babies;
   (b) calcium in an amount ranging from above 1,000 mg to about 2,000 mg;
   (c) DHA in an amount that is effective for providing, or increasing the supply of, DHA to developing fetuses or breast-feeding babies, and that is not harmful to developing fetuses or breast-feeding babies; and
   (d) one or more DHA taste-masking agents in a combined amount that is effective for masking the taste of the DHA, and that is not harmful to developing fetuses or breast-feeding babies;
wherein the food bar supplements the dietary requirements of pregnant women, lactating women or women having childbearing potential that are attempting to become pregnant, wherein the food bar does not have a fishy taste, wherein the DHA is present in an amount ranging from about 0.05 to about 3 weight percent of the food bar, wherein the combined amount of the DHA taste-masking agents ranges from about 3 to about 40 weight percent of the food bar, wherein the one or more vitamins and minerals are present in an amount ranging from about 5 to about 25 weight percent of the food bar, and wherein the food bar contains the following vitamins and minerals, and quantities thereof:

Vitamin A—from about 1,000 to about 7,000 I.U.
Vitamin $B_1$—from about 1.4 to about 10 mg
Vitamin $B_2$—from about 1.6 to about 25 mg
Vitamin $B_3$—from about 17 to about 40 mg
Vitamin $B_6$—from about 2.2 to about 40 mg Vitamin B$_{9/M}$—from about 400 to about 1,000 mcg
Vitamin B$_{12}$—from about 2.6 to about 18 mcg
Biotin—from about 30 to about 400 mcg
Vitamin C—from about 80 to about 500 mg
Vitamin D—from about 200 to about 400 I.U.
Vitamin E—from about 10 to about 400 I.U.
Vitamin K—from about 10 to about 65 mcg
Iron—from about 18 to about 90 mg
Phosphorus—from about 100 to about 1,250 mg
Pantothenic Acid—from about 6 to about 15 mg
Iodine—from about 175 to about 200 mcg
Magnesium—from about 200 to about 500 mg
Zinc—from about1 to about 25 mg
Selenium—from about 60 to about 100 mcg
Copper—from about 0.1 to about 2 mg
Manganese—from about 0.1 to about 5 mg
Chromium—from about 0.1 to about 120 mcg
Molybdenum—from about 0.1 to about 50 mcg
Choline—from about 300 to about 600 mg
Fluoride—from about1 to about 4 mg
Chloride—from about 10 to about 1,000 mg
Potassium—from about 10 to about 80 mg
Sodium—from about 10 to about 1,000 mg.

2. The food bar of claim 1 wherein the food bar is recommended for consumption by pregnant women, the food bar supplements the dietary requirements of pregnant women, and the food bar contains the following vitamins and minerals, and quantities thereof:

Vitamin A—about 5,000 I.U.
Vitamin B$_1$—about 3 mg
Vitamin B$_2$—about 3.4 mg
Vitamin B$_3$—about 20 mg
Vitamin B$_6$—about 10 mg
Vitamin B$_{9/M}$—about 1,000 mcg
Vitamin B$_{12}$—about 12 mcg
Biotin—about 30 mcg
Vitamin C—about 120 mg
Vitamin D—about 400 I.U.
Vitamin E—about 30 I.U.
Vitamin K—about 10 mcg
Calcium—about 1,300 mg
Iron—about 27 mg
Phosphorus—about 100 mg
Pantothenic Acid—about 10 mg
Iodine—about 175 mcg
Magnesium—about 400 mg
Zinc—about 10 mg
Selenium—about 60 mcg
Copper—about 2 mg
Manganese—about 5 mg
Chromium—about 25 mcg
Molybdenum—about 25 mcg
Choline—about 450 mg.

3. The food bar of claim 1 wherein the food bar is recommended for consumption by lactating women, the food bar supplements the dietary requirements of lactating women, and the food bar contains the following vitamins and minerals, and quantities thereof:

Vitamin A—about 7,000 I.U.
Vitamin B—about 3.2 mg
Vitamin B$_2$—about 3.9 mg
Vitamin B$_3$—about 24 mg
Vitamin B$_6$—about 9.5 mg
Vitamin B$_{9/M}$—about 400 mcg
Vitamin B$_{12}$—about 14 mcg
Biotin—about 35 mcg
Vitamin C—about 163 mg
Vitamin D—about 400 I.U.
Vitamin E—about 36 I.U.
Vitamin K—about 10 mcg
Calcium—about 1,300 mg
Iron—about 27 mg
Phosphorus—about 100 mg
Pantothenic Acid—about 10 mg
Iodine—about 200 mcg
Magnesium—about 360 mg
Zinc—about 10 mg
Selenium—about 70 mcg
Copper—about 2 mg
Manganese—about 5 mg
Chromium—about 25 mcg
Molybdenum—about 25 mcg
Choline—about 550 mg.

4. A method for pre paringfood bars comprising:

(a) forming a blend of one or more oil-soluble vitamins and minerals recommended for consumption by pregnant women, lactating women or women of childbearing potential that are attempting to become pregnant in an amount that is effective for enhancing the nutrition of pregnant women, lactating women, or women of childbearing potential that are attempting to become pregnant, and that is not harmful to developing fetuses or breast-feeding babies, and one or more DHA taste-masking agents in an amount that is effective for reducing the taste of the DHA, and that is not harmful to developing fetuses or breast-feeding babies, with a fat that has been heated to a temperature ranging from about 160° F. to about 180° F., wherein the fat ranges from about 1 to about 60 weight percent of the food bars;

(b) cooling the blend of step (a) to a temperature ranging from about 135° F. to about 150° F.;

(c) mixing the blend of step (b) with DHA in an amount that is effective for providing, or increasing the supply of, DHA to a developing fetus or baby, and that is not harmful to developing fetuses or breast-feeding babies, and one or more DHA taste-masking agents in an amount that is effective for reducing the taste of the DHA, and that is not harmful to developing fetuses or breast-feeding babies, and, optionally, one or more anti-constipation and regularity-maintaining agents in an amount that is effective for maintaining regularity of bowel movements, or for reducing or eliminating constipation, and that is not harmful to developing fetuses or breast-feeding babies, until a blend is obtained;

(d) extruding the blend of step (c) to produce bars of a desired shape and size; and (e) placing a top layer upon the bars of step (d) in an amount ranging from about 5 to about 50 weight percent of the food bars, wherein the top layer contains one or more water-soluble vitamins and minerals recommended for consumption by pregnant women, lactating women or women of childbearing potential that are attempting to become pregnant in an amount that is effective for enhancing the nutrition of pregnant women, lactating women, or women of childbearing potential that are attempting to become pregnant, and that is not harmful to developing fetuses or breast-feeding babies, calcium in an amount sufficient to provide the food bars with an amount of calcium ranging from above 1,000 mg to about 3,000 mg, and one or more DHA taste-masking agents in an amount that is effective for reducing the taste of the DHA, and that is not harmful to developing fetuses or breast-feeding babies;

wherein the food bars supplement the dietary requirements of pregnant women, lactating women or women of childbearing potential that are attempting to become pregnant, and wherein the food bars do not have a fishy taste.

5. The method of claim 4 wherein the method further comprises the step of placing an artificial chocolate coating upon the bars of step (e), wherein the artificial chocolate coating is in an amount ranging from about 5 to about 30 weight percent of the food bars.

6. The method of claim 5 wherein the method further comprises the step of packaging each food bar in a separate hermetically sealed package having a nitrogen atmosphere enclosed by a barrier film.

7. The method of claim 6 wherein the method further comprises the step of adding the sealed package to an aluminum can, purging the can with a nitrogen atmosphere and vacuum sealing the can.

8. The method of claim 7 wherein the method additionally comprises the step of irradiating the bars of step (e) prior to packaging.

* * * * *

UNITED STATES PATENT AND TRADEMARK OFFICE
CERTIFICATE OF CORRECTION

| | |
|---|---|
| PATENT NO. | : 6,576,253 B2 |
| APPLICATION NO. | : 10/078814 |
| DATED | : June 10, 2003 |
| INVENTOR(S) | : Paul B. Manning, Jack H. Schramm and James W. McGrath, Jr. |

It is certified that error appears in the above-identified patent and that said Letters Patent is hereby corrected as shown below:

Column 15, Line 18, change "1." to --1--.

Column 15, Line 22, change "Taxation" to --laxation--.

Column 19, Line 48, change "it" to --if--.

Column 22, Line 34, change "three four," to --three, four,--.

Column 28, Line 61, change "1 corn" to --1: corn--.

Column 30, Line 54 (claim 1), change "0.05" to --.05--.

Column 32, Line 30 (claim 4), change "pre paringfood" to --preparing food.--

Signed and Sealed this

Twenty-second Day of January, 2008

JON W. DUDAS
*Director of the United States Patent and Trademark Office*